(12) United States Patent
Honey et al.

(10) Patent No.: US 12,225,844 B2
(45) Date of Patent: Feb. 18, 2025

(54) CROP DIVIDER STRUCTURE FOR CUTTING SYSTEM

(71) Applicant: HONEY BEE MANUFACTURING LTD., Frontier (CA)

(72) Inventors: Glenn Honey, Bracken (CA); Lee Glenn Harper, Shaunavon (CA)

(73) Assignee: HONEY BEE MANUFACTURING LTD., Frontier (CA)

( * ) Notice: Subject to any disclaimer, the term of this patent is extended or adjusted under 35 U.S.C. 154(b) by 0 days.

(21) Appl. No.: 17/881,538

(22) Filed: Aug. 4, 2022

(65) Prior Publication Data

US 2022/0369547 A1      Nov. 24, 2022

Related U.S. Application Data

(63) Continuation of application No. 16/875,570, filed on May 15, 2020, now Pat. No. 11,425,859, which is a
(Continued)

(30) Foreign Application Priority Data

Jul. 29, 2016   (CA) ................................ CA 2937639

(51) Int. Cl.
    *A01D 34/13*     (2006.01)
    *A01D 34/135*    (2006.01)
    (Continued)

(52) U.S. Cl.
    CPC ........... *A01D 34/13* (2013.01); *A01D 34/135* (2013.01); *A01D 34/412* (2013.01); *A01D 34/64* (2013.01); *A01D 43/10* (2013.01)

(58) Field of Classification Search
    CPC .... A01D 34/13; A01D 34/135; A01D 34/412; A01D 34/64; A01D 43/10
    See application file for complete search history.

(56) References Cited

U.S. PATENT DOCUMENTS

| 12,750 A |   | 4/1855 | Chatfield |
| 19,894 A | * | 4/1858 | Harding ................. A01D 34/13 56/299 |

(Continued)

FOREIGN PATENT DOCUMENTS

| CA | 1003310 | 1/1977 |
| CA | 1040438 | 10/1978 |

(Continued)

*Primary Examiner* — Arpad Fabian-Kovacs

(57) ABSTRACT

A cutting system for a harvesting header includes a transversely extending cutter bar. First and second transversely extending knife backs are supported in relation to the cutter bar and are axially aligned with each other in a transverse direction. The first and second knife backs may each have a main body portion. At least one knife section is mounted to each of the first and second knife backs, each knife section having at least one knife edge extending generally in a forward direction. The first knife back is not attached to said second knife back. A crop divider structure is interconnected to the cutter bar and is operationally positioned between said first and second knife backs. The cutting system may also include first and second knife heads interconnected to the first and second knife backs and operable for interconnecting a knife drive system to drive the first and second knife backs.

38 Claims, 24 Drawing Sheets

Related U.S. Application Data continuation of application No. 15/653,096, filed on Jul. 18, 2017, now Pat. No. 10,687,465.

(51) Int. Cl.
*A01D 34/412* (2006.01)
*A01D 34/64* (2006.01)
*A01D 43/10* (2006.01)

(56) References Cited

U.S. PATENT DOCUMENTS

| | | | |
|---|---|---|---|
| 173,851 A * | 2/1876 | Freeman | A01D 34/13 30/223 |
| 375,237 A * | 12/1887 | Wardall | A01D 34/135 30/223 |
| 524,215 A | 8/1894 | Quigley | |
| 2,413,072 A | 12/1946 | Sage | |
| 2,694,894 A | 11/1954 | Linscheld | |
| 3,257,789 A * | 6/1966 | Carlson | A01D 34/13 56/10.4 |
| 3,314,222 A | 4/1967 | Scarnato et al. | |
| 3,401,512 A | 9/1968 | Pool et al. | |
| 3,468,109 A | 9/1969 | Reimer | |
| 3,472,008 A | 10/1969 | Hurlburt | |
| 3,550,366 A | 12/1970 | Gibson | |
| 3,664,103 A | 5/1972 | McNair | |
| 3,771,299 A | 11/1973 | Gradwohl et al. | |
| 3,927,512 A | 12/1975 | Molzahn | |
| 3,978,645 A | 9/1976 | Bennett et al. | |
| 4,021,999 A | 5/1977 | Case | |
| 4,038,810 A | 8/1977 | Williams et al. | |
| 4,067,177 A | 1/1978 | Tout | |
| 4,120,137 A | 10/1978 | Schoenberger et al. | |
| 4,127,981 A | 12/1978 | Parrish et al. | |
| 4,137,696 A | 2/1979 | Webb | |
| 4,156,340 A | 5/1979 | Colgan et al. | |
| 4,174,602 A | 11/1979 | Webb et al. | |
| 4,177,625 A | 12/1979 | Knight et al. | |
| 4,187,664 A | 2/1980 | Meek et al. | |
| 4,198,803 A | 4/1980 | Quick et al. | |
| 4,202,154 A | 5/1980 | Waldrop et al. | |
| 4,246,742 A | 1/1981 | Clark et al. | |
| 4,270,338 A | 6/1981 | Halls | |
| 4,346,909 A | 8/1982 | Hundeby | |
| 4,353,201 A | 10/1982 | Pierce et al. | |
| 4,435,948 A | 3/1984 | Jennings | |
| 4,512,140 A | 4/1985 | Blakeslee | |
| 4,519,190 A | 5/1985 | Blakeslee | |
| 4,522,018 A | 6/1985 | Blakeslee | |
| 4,541,229 A | 9/1985 | Elijah | |
| 4,573,124 A | 2/1986 | Seiferling | |
| 4,573,309 A | 3/1986 | Patterson | |
| 4,612,757 A | 9/1986 | Halls et al. | |
| 4,637,201 A | 1/1987 | Pruitt et al. | |
| 4,641,490 A | 2/1987 | Wynn et al. | |
| 4,644,738 A * | 2/1987 | Krambeck | A01D 34/13 56/297 |
| 4,660,361 A | 4/1987 | Remillard et al. | |
| 4,662,161 A | 5/1987 | Patterson | |
| 4,751,809 A | 6/1988 | Fox et al. | |
| 4,776,155 A | 10/1988 | Fox et al. | |
| 4,833,869 A | 5/1989 | Klein | |
| 4,854,114 A | 8/1989 | Speck | |
| 4,894,979 A | 1/1990 | Lohrentz | |
| 4,909,026 A | 3/1990 | Molzahn et al. | |
| 4,936,082 A | 6/1990 | Majkrzak | |
| 4,944,141 A | 7/1990 | Orlando et al. | |
| 4,956,966 A | 9/1990 | Patterson | |
| 5,005,343 A | 4/1991 | Patterson | |
| 5,007,235 A | 4/1991 | Nickel et al. | |
| 5,054,277 A | 10/1991 | Schumacher, II et al. | |
| 5,086,613 A | 2/1992 | Fox et al. | |
| 5,155,983 A | 10/1992 | Sheehan et al. | |
| 5,157,905 A | 10/1992 | Talbot et al. | |
| 5,243,810 A | 9/1993 | Fox et al. | |
| 5,261,290 A | 11/1993 | Ramsay et al. | |
| 5,343,682 A | 9/1994 | Puncochar | |
| 5,359,839 A | 11/1994 | Parsons et al. | |
| 5,435,239 A | 7/1995 | Talbot | |
| 5,459,986 A | 10/1995 | Talbot et al. | |
| 5,473,872 A | 12/1995 | Fox et al. | |
| 5,535,577 A | 7/1996 | Chmielewski et al. | |
| 5,595,053 A | 1/1997 | Jasper et al. | |
| RE35,543 E | 7/1997 | Patterson | |
| 5,678,398 A | 10/1997 | Fox et al. | |
| 5,681,117 A | 10/1997 | Wellman et al. | |
| 5,694,754 A | 12/1997 | Shuknecht et al. | |
| 5,704,200 A | 1/1998 | Chmielewski, Jr. et al. | |
| 5,791,128 A | 8/1998 | Rogalsky | |
| 5,927,606 A | 7/1999 | Patterson | |
| 5,992,759 A | 11/1999 | Patterson | |
| 6,029,429 A | 2/2000 | Fox et al. | |
| 6,079,194 A | 6/2000 | Waldrop | |
| 6,116,010 A * | 9/2000 | Salley | A01D 34/13 56/298 |
| 6,195,972 B1 | 3/2001 | Talbot et al. | |
| 6,199,358 B1 | 3/2001 | Majkrzak | |
| 6,282,876 B1 | 9/2001 | Patterson | |
| 6,305,154 B1 | 10/2001 | Yang et al. | |
| 6,324,823 B1 | 12/2001 | Remillard | |
| 6,351,931 B1 | 3/2002 | Shearer | |
| 6,397,573 B2 | 6/2002 | Majkrzak | |
| 6,442,918 B1 | 9/2002 | Fox | |
| 6,453,655 B2 | 9/2002 | Ferraris | |
| 6,467,246 B1 | 10/2002 | McCredie | |
| 6,519,923 B1 | 2/2003 | Cooksey et al. | |
| 6,530,202 B1 | 3/2003 | Guyer | |
| 6,543,211 B1 | 4/2003 | Talbot | |
| 6,591,598 B2 | 7/2003 | Remillard et al. | |
| 6,675,568 B2 | 1/2004 | Patterson et al. | |
| 6,698,175 B1 | 3/2004 | Schumacher et al. | |
| 6,708,476 B1 * | 3/2004 | Blakeslee | A01D 34/135 56/257 |
| 6,817,166 B2 | 11/2004 | Dunn | |
| 6,843,045 B2 | 1/2005 | Bickel | |
| 6,854,251 B2 | 2/2005 | Snider | |
| 6,865,871 B2 | 3/2005 | Patterson et al. | |
| 6,889,492 B1 | 5/2005 | Polk et al. | |
| 6,962,040 B2 | 11/2005 | Talbot | |
| 7,077,220 B2 | 7/2006 | Dunn et al. | |
| 7,159,687 B2 | 1/2007 | Dunn et al. | |
| 7,188,461 B2 | 3/2007 | Fox et al. | |
| 7,197,865 B1 | 4/2007 | Enns et al. | |
| 7,306,062 B2 | 12/2007 | Dunn | |
| 7,306,252 B2 | 12/2007 | Barnett | |
| 7,308,947 B2 | 12/2007 | Barnett | |
| 7,313,903 B2 | 1/2008 | Schumacher et al. | |
| 7,322,175 B2 | 1/2008 | Ferre et al. | |
| 7,328,565 B2 | 2/2008 | Snider et al. | |
| 7,340,876 B1 | 3/2008 | Barnett | |
| 7,347,277 B2 | 3/2008 | Enns et al. | |
| 7,356,982 B2 | 4/2008 | Barnett | |
| 7,364,181 B2 | 4/2008 | Patterson | |
| 7,373,769 B2 | 5/2008 | Talbot et al. | |
| 7,392,124 B2 | 6/2008 | MacGregor et al. | |
| 7,392,646 B2 | 7/2008 | Patterson | |
| 7,438,305 B2 | 10/2008 | Schulz | |
| 7,444,798 B2 | 11/2008 | Patterson et al. | |
| 7,454,888 B2 | 11/2008 | Barnett | |
| 7,461,498 B1 | 12/2008 | Barnett | |
| 7,467,505 B2 | 12/2008 | MacGregor | |
| 7,472,533 B2 | 1/2009 | Talbot et al. | |
| 7,484,349 B2 | 2/2009 | Talbot et al. | |
| 7,497,069 B2 | 3/2009 | Enns et al. | |
| 7,647,755 B2 | 1/2010 | Barnett et al. | |
| 7,721,830 B2 | 5/2010 | Dunn et al. | |
| 7,730,707 B2 | 6/2010 | Pietricola et al. | |
| 7,827,775 B2 * | 11/2010 | Sethi | A01D 57/20 56/314 |
| 7,849,952 B2 | 12/2010 | MacGregor et al. | |
| 7,856,801 B2 | 12/2010 | Remillard | |
| 7,874,132 B2 * | 1/2011 | Sauerwein | A01D 41/141 56/10.2 E |

(56) References Cited

U.S. PATENT DOCUMENTS

| | | | |
|---|---|---|---|
| 7,886,512 B2* | 2/2011 | Lohrentz | A01D 57/20 56/181 |
| 7,918,076 B2 | 4/2011 | Talbot | |
| 7,958,706 B2 | 6/2011 | Remillard et al. | |
| 7,958,711 B1* | 6/2011 | Sauerwein | A01D 57/20 56/181 |
| 8,006,469 B2 | 8/2011 | Barnett | |
| 8,015,784 B2 | 9/2011 | Barnett et al. | |
| 8,020,363 B1 | 9/2011 | Barnett et al. | |
| 8,020,648 B2 | 9/2011 | Otto | |
| 8,056,311 B1 | 11/2011 | Barnett | |
| 8,069,640 B2 | 12/2011 | Barnett et al. | |
| 8,096,102 B2 | 1/2012 | Smith | |
| 8,117,812 B2 | 2/2012 | Patterson | |
| 8,161,719 B2 | 4/2012 | Barnett et al. | |
| 8,176,716 B2 | 5/2012 | Coers et al. | |
| 8,225,589 B2 | 7/2012 | Barnett | |
| 8,225,903 B2 | 7/2012 | Dunn | |
| 8,240,114 B2 | 8/2012 | Barnett | |
| 8,245,489 B2 | 8/2012 | Talbot | |
| 8,286,411 B2 | 10/2012 | Barnett et al. | |
| 8,286,412 B2 | 10/2012 | Kidd et al. | |
| 8,291,684 B2 | 10/2012 | Remillard et al. | |
| 8,291,686 B1 | 10/2012 | Cormier et al. | |
| 8,307,620 B1 | 11/2012 | Barnett et al. | |
| 8,333,057 B2 | 12/2012 | Schroeder et al. | |
| 8,341,927 B2 | 1/2013 | Barnett | |
| 8,387,351 B2 | 3/2013 | Guyer | |
| 8,402,728 B2 | 3/2013 | Kidd | |
| 8,408,567 B2 | 4/2013 | Bergman et al. | |
| 8,434,290 B2 | 5/2013 | Barnett et al. | |
| 8,468,789 B2 | 6/2013 | Barnett et al. | |
| 8,484,938 B2 | 7/2013 | Cormier et al. | |
| 8,484,939 B1 | 7/2013 | Cormier et al. | |
| 8,511,050 B1 | 8/2013 | Cormier et al. | |
| 8,590,284 B2 | 11/2013 | Rayfield | |
| 2002/0035827 A1 | 3/2002 | Yang et al. | |
| 2004/0216440 A1 | 11/2004 | Talbot | |
| 2005/0016151 A1 | 1/2005 | Lolley | |
| 2008/0006016 A1* | 1/2008 | Snider | A01D 34/135 56/297 |
| 2012/0251653 A1 | 10/2012 | Mathy, Jr. et al. | |
| 2012/0260870 A1 | 10/2012 | Wahl et al. | |
| 2013/0036860 A1 | 2/2013 | Corniani | |
| 2013/0186053 A1 | 7/2013 | Talbot | |
| 2013/0305679 A1 | 11/2013 | Talbot et al. | |
| 2014/0001726 A1 | 1/2014 | Statz | |
| 2014/0033672 A1 | 2/2014 | Talbot | |
| 2014/0033940 A1 | 2/2014 | Simpson et al. | |
| 2014/0150601 A1 | 6/2014 | McGrath | |
| 2014/0182259 A1* | 7/2014 | Talbot | A01D 34/18 56/298 |
| 2014/0196427 A1 | 7/2014 | Fuechtling | |
| 2015/0163995 A1* | 6/2015 | Talbot | A01D 34/17 56/298 |
| 2015/0163996 A1* | 6/2015 | Talbot | A01D 34/18 56/298 |
| 2015/0163997 A1* | 6/2015 | Talbot | A01D 34/17 56/298 |
| 2015/0163998 A1* | 6/2015 | Talbot | A01D 34/14 56/298 |
| 2016/0174460 A1* | 6/2016 | Honey | A01D 34/145 56/181 |
| 2018/0007827 A1* | 1/2018 | Talbot | A01D 34/13 |
| 2019/0053424 A1* | 2/2019 | Talbot | A01D 34/135 |
| 2019/0053425 A1* | 2/2019 | Talbot | A01D 34/16 |
| 2019/0357438 A1* | 11/2019 | Zumbach | A01D 34/38 |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |

(56) References Cited

FOREIGN PATENT DOCUMENTS

| | | |
|---|---|---|
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| CA | 2818138 A1 | 1/2014 |
| CA | 2839307 A1 | 3/2014 |
| CA | 2976844 A1 | 2/2019 |
| CA | 2976845 A1 | 2/2019 |
| CA | 2976843 C | 11/2019 |
| EP | 1935226 | 6/2008 |
| WO | 2012/166629 | 12/2012 |

* cited by examiner

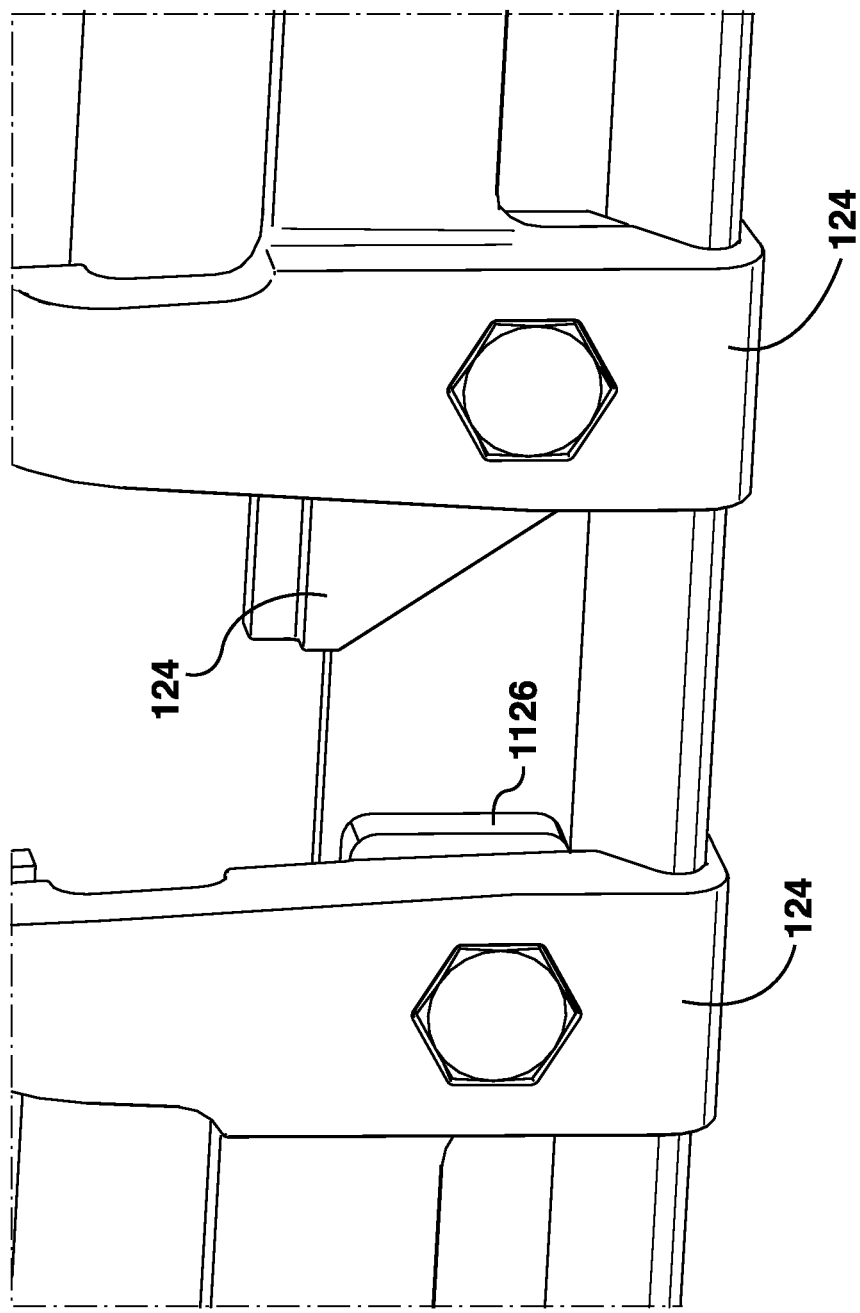

CROP DIVIDER STRUCTURE FOR CUTTING SYSTEM

CROSS-REFERENCE TO RELATED APPLICATIONS

This application is a continuation of U.S. patent application Ser. No. 16/875,570 filed on May 15, 2020, which is a continuation of U.S. patent application Ser. No. 15/653,096 filed on Jul. 18, 2017 (now U.S. Pat. No. 10,687,465 issued on Jun. 23, 2020). This application also claims the foreign priority benefit of corresponding Canadian Patent Application Serial No. 2,937,639 filed on Jul. 29, 2016. The entire contents of the aforementioned applications are incorporated by reference herein.

FIELD

This disclosure is in the field of agricultural equipment, and in particular relates to cutting systems on crop cutting headers.

BACKGROUND

Some types of known harvesting equipment employ harvesting headers to cut crops for various purposes, such as for windrowing or swathing, or for the feeding of a combine harvester.

Attached to the front/forward portion of a combine harvester or other equipment (such as for example a swather) is the portion that is referred to as the header. A typical header is equipped with a crop cutting system. The header also typically includes a crop moving system such as an auger or a conveyor deck/surface located behind the cutting system onto which cut crop material can be deposited to be moved to for example to a windrow discharge or into the intake of a combine. The header also typically includes a reel which has a reel shaft mounted between two rotational mounts at either end of the header with a rotational power drive interconnected thereto. The reel typically has rotating bats having fingers/tines attached thereto. Rotation of the bats assists in moving standing crop material toward the cutting system, so the crop material can be cut, and then the cut crop material is deposited on the crop moving system.

Known cutting systems employ a relatively large number of components arranged in a relatively complex manner. There are a number of factors with respect to the construction/configuration of the cutting system and the components thereof that can limit the ability of the cutting system to cut crop material at a location on the crop material that is close to the ground surface over which the header and its cutting system are moving. The ability to cut close to the ground surface is particularly important in cutting certain types of crops like pulse crops which include chickpeas, peas, and lentils which mature close to the ground surface. Additionally, known cutting systems utilize a considerable number of separate parts in combination—adding to overall costs associated with these parts and their assembly. The shape profile of known cutting systems can also inhibit the movement of crop material into the cutting system and the movement of cut crop material onto the crop moving system. By way of example, known cutting systems typically include upstanding hold-down devices to hold down the transversely reciprocating knife assemblies from above. Such hold-down devices, which are typically positioned at spaced locations along the length of the cutting system can, at least to some extent, impede the flow of crop material to the crop moving system. The impeding of cut crop flow can cause cut crop material to be lost (eg. cut crop material will drop off the front of the cutting system and onto the ground below, and then pass beneath the header).

Some known cutting systems include reciprocating knife sections with knife blades. The knife sections are typically protected by knife guards. The knife guards typically have to resist, and to some extent absorb, the major forces imparted onto the header that result from the forward movement of the header during operation. The knife guards will often be in ground contact and impact upon hard items in the ground (eg. rocks). Bent or broken guards will typically occur periodically and this can reduce the level of performance of the cutting system. Such damaged/broken guards need to be replaced, but is desirable that the interval between replacement be relatively long.

Known cutting systems also typically include one or more skid shoes/plates positioned beneath a cutter bar and provide some degree of wear protection for the cutter bar of a cutting system. Known systems to secure skid shoes/plates typically use a plurality of separate retainer clips to assist in securing the skid shoes in their proper position. In some known systems, one clip may be used for each skid shoe/knife guard. The clips may be made from bent/stamped steel. The retainer clips are potentially subject to considerable wear due to their proximity on the underside of the cutter bar. They also require additional time to attach to other components of the cutting system.

It is desirable to provide an improved cutting system for a header.

SUMMARY

The disclosure describes a cutting system for a harvesting header. The cutting system includes a transversely extending cutter bar, a transversely extending knife back, the knife back having a main body portion, and at least one knife section having at least one knife edge extending generally in a forward direction, the at least one knife section being connecteded to the knife back. The cutting system also includes a knife guard component, the knife guard component having a front guard portion and a rear portion interconnected by a medial portion, the medial portion having a recess, the medial portion for receiving a lengthwise portion of the knife back with the knife section being received into, the knife section operable to move transversely at least partially into and out of a cutting slot in the front guard portion. The cutting system also includes a hold down component including a body portion located between an upper surface of the rear portion of the knife guard component and an underneath surface of the cutter bar, and an attachment mechanism operable to secure the knife guard component and the hold down component to the underneath surface of the cutter bar.

The hold down component may further include a flange portion that extends forwardly from the body portion of the hold down component and at a vertical position above a rear edge of the at least one knife section, such that in operation, the flange portion is operable to restrict upward movement of the knife back and the at least one knife section relative to the hold down component and the knife guard component.

The rear portion of the knife guard component may have a forward region that is located below the rear edge of the at least one knife section such that in operation, the rear portion of the knife guard component is operable to restrict downward movement of the knife back and the at least one knife section relative to the hold down component and the knife guard component.

The flange portion of the hold down component may further include a forward facing surface that is operable to restrict rearward movement of the knife back and the at least one knife section relative to the hold down component and the knife guard component.

The rear portion of the knife guard component has a forward region that is located below the rear edge of the at least one knife section such that in operation, the rear portion of the knife guard component is operable to restrict downward movement of the knife back and the at least one knife section relative to the hold down component and the knife guard component. The flange portion of the hold down component may further include a forward facing surface that is operable to restrict rearward movement of the knife back and the at least one knife section relative to the hold down component and the knife guard component.

The front guard portion of the knife guard component may have a rearward facing surface that is operable to restrict forward movement of the knife back and the at least one knife section relative to the hold down component and the knife guard component.

A forward facing surface of a flange portion of the hold down component and the rearward facing surface of the front guard portion of the knife guard component may be operable to substantially eliminate forward and rearward movement of the knife back and the at least one knife section relative to the hold down component and the knife guard component.

The front guard portion of the knife guard component may have at least one surface portion operable to engage an upper surface of the at least one knife section to restrict upward vertical movement of the knife back and the at least one knife section relative to the hold down component and the knife guard component.

The at least one knife section may be mounted to a lower surface of the knife back.

The at least one knife section may be mounted to the lower surface of the knife back with a bolt having a head located proximate the lower surface of the knife back. In operation the medial portion may receive therein the head of the bolt during transverse movement of the knife back and the at least one knife section.

The cutting system may further include a skid shoe operable to be secured to the knife guard component to provide protection to a lower surface region of the cutter bar.

The skid shoe may be operable to be secured at a forward region of the skid shoe to the knife guard component and at a rearward region of the skid shoe to the cutter bar.

The rear portion of the knife guard component may have at least one integrally formed clip device operable to engage with a forward portion of the skid shoe.

The attachment mechanism may include at least one bolt passing through aligned openings in the rear portion of the knife guard component, the body of the hold-down component, and the cutter bar, to secure the knife guard component and the hold-down component at an underneath surface area of the cutter bar.

The at least one bolt may have a bolt head that is substantially entirely located within a recess at a lower surface of the rear portion of the knife guard component.

The rear portion of the knife guard component may have an integrally formed clip portion operable to engage a forward edge portion of a skid shoe, to assist in retaining the skid shoe in a protection position against a lower surface region of the cutter bar.

When the knife guard component and the hold-down component are connected to the underneath surface of the cutter bar, the components may be generally arranged from forward to rearward as follows: (a) an upper surface of the front guard portion of the least one knife guard component; (b) an upper surface area of the longitudinally extending knife back; (c) an upper surface of a forwardly extending flange portion of the hold down component; and (d) an upper surface of the cutter bar.

When the knife guard component and the hold-down component are connected to the underneath surface of the cutter bar, the components may provide: (a) an upper surface of the front guard portion of the knife guard component; (b) an upper surface area of the longitudinally extending knife back; (c) an upper surface of a forwardly extending flange portion of the hold down component; and (d) an upper surface of the cutter bar; that co-operate to provide a substantially smooth, uninterrupted surface region between the forward front guard portion and the rearward cutter bar.

The body portion of the hold down component may have transversely opposed upper surface areas which are both respectively tapered downward toward outer side edges.

The cutting system may further include a knife drive mechanism operable to drive the knife back and the at least one knife section in reciprocating transverse movement.

The disclosure also describes a cutting system for a harvesting header. The cutting system includes a transversely extending cutter bar, a transversely extending knife back, the knife back having a main body portion, and a plurality of knife sections, each knife section of the plurality of knife sections having at least one knife edge extending generally in a forward direction, the plurality of knife sections being connected to the knife back in series transversely along the knife back. The cutting system also includes a plurality of knife guard components, each knife guard component of the plurality of knife guards components having a front guard portion and a rear portion interconnected by a medial portion, the medial portion having a recess, the medial portion for receiving a lengthwise portion of the knife back with at least one attached knife section being received into, the at least one knife section operable to move transversely at least partially into and out of a cutting slot in the front guard portion. The cutting system also includes a plurality of hold down components, each hold down component including a body portion located between an upper surface of the rear portion of at least one knife guard component and an underneath surface of the cutter bar, and an attachment mechanism operable to secure the plurality of knife guard components and the plurality of hold down components to the underneath surface of the cutter bar.

Each hold down component of the plurality of hold down components may further include a flange portion that extends forwardly from the body portion of the hold down component and at a vertical position above a rear edge of at least one knife section of the plurality of knife sections, such that in operation, the flange portions of the plurality of hold down components are operable to restrict upward movement of the knife back and the plurality of knife sections relative to the hold down component and the knife guard component.

The rear portion of each knife guard component of the plurality of knife guard components may have a forward region that is located below the rear edge of the at least one knife section such that in operation, the rear portion of each knife guard component of the plurality of knife guard components is operable to restrict downward movement of the knife back and the plurality of knife sections relative to the hold down component and the knife guard component.

The flange portion of each of the hold down component of the plurality of hold down components may further include a forward facing surface that is operable to restrict rearward movement of the knife back and the plurality of knife sections relative to the hold down component and the knife guard component.

The rear portion of each knife guard component of the plurality of knife guard components may have a forward region that is located below the rear edge of the at least one knife section such that in operation, the rear portion of each knife guard component of the plurality of knife guard components is operable to restrict downward movement of the knife back and the plurality of knife sections relative to the hold down component and the knife guard component. The flange portion of each of the hold down component of the plurality of hold down components may further include a forward facing surface that is operable to restrict rearward movement of the knife back and the plurality of knife sections relative to the hold down component and the knife guard component.

The front guard portion of each knife guard component of the plurality of knife guard components may have a rearward facing surface that is operable to restrict forward movement of the knife back and the plurality of knife sections relative to the hold down component and the knife guard component.

A forward facing surface of a flange portion of each the hold down component and the rearward facing surface of the front guard portion of each the knife guard component may be operable to substantially eliminate forward and rearward movement of the knife back and the plurality of knife sections relative to the hold down component and the knife guard component.

The front guard portion of each knife guard component of the plurality of knife guard components may have at least one surface portion operable to engage an upper surface of at least one knife section of the plurality of knife sections to restrict upward vertical movement of the knife back and the plurality of knife sections relative to the hold down component and the knife guard component.

The plurality of knife sections may be mounted transversely in series to a lower surface of the knife back.

Each knife section of the plurality of knife sections may be mounted to the lower surface of the knife back with at least one bolt having a head located proximate the lower surface of the knife back. In operation the medial portion may receive therein the head of each the at least one bolt during transverse movement of the knife back and the at least one knife section.

The cutting system may further include at least one skid shoe operable to be secured to each of the knife guard components to provide protection to a lower surface region of the cutter bar.

The at least one skid shoe may be operable to be secured at a forward region of the at least one skid shoe to each the knife guard component and at a rearward region of the at least one skid shoe to the cutter bar.

The rear portion of the knife guard component may have at least one integrally formed clip device operable to engage with a forward portion of the skid shoe.

The attachment mechanism may include at least one bolt passing through aligned openings in each the rear portion of each knife guard component of the plurality of knife guard components, the body of each respective hold down component of the plurality of hold down components, and the cutter bar, to secure the plurality of knife guard components and the plurality of hold down components at an underneath surface area of the cutter bar.

Each the at least one bolt may have a bolt head that is substantially entirely located within a recess at a lower surface of the respective rear portion of each the knife guard component.

The rear portion of each the knife guard component may have an integrally formed clip portion operable to engage a forward edge portion of a skid shoe, to assist in retaining the skid shoe in a protection position against a lower surface region of the cutter bar.

When the plurality of knife guard components and the plurality of hold down components are connected to the underneath surface of the cutter bar, the components may be generally arranged from forward to rearward as follows: (a) an upper surface of the front guard portion of each the knife guard component; (b) an upper surface area of the longitudinally extending knife back member; (c) an upper surface of a forwardly extending flange portion of each the hold down component; and (d) an upper surface of the cutter bar.

When the plurality of knife guard components and the plurality of hold down components are connected to the underneath surface of the cutter bar, the components may provide: (a) an upper surface of the front guard portion of each the knife guard component; (b) an upper surface area of the longitudinally extending knife back member; (c) an upper surface of a forwardly extending flange portion of each the hold down component; and (d) an upper surface of the cutter bar; that co-operate to provide a substantially smooth, uninterrupted surface region between the forward upper guard portion and the rearward cutter bar.

The body portion of each the hold down component may have transversely opposed upper surface areas which are both respectively tapered downward toward outer side edges.

The cutting system may further include a knife drive mechanism operable to drive the knife back and the plurality of knife sections in reciprocating transverse movement.

The disclosure also describes a header for an agricultural equipment apparatus. The header includes a frame, and cutting system attached to the frame, the cutting system including any of the above cutting systems.

The disclosure also describes an agricultural equipment apparatus. The apparatus includes a propulsion unit, and a header including (i) a frame and (ii) a cutting system attached to the frame, the cutting system including any of the above cutting systems.

The disclosure also describes a method of assembling a cutting system. The method involves (a) attaching a plurality of knife sections to a knife back; (b) loosely mounting a plurality of main guard components and a plurality of corresponding hold-down components at a lower surface area of the cutter bar, such that a body portion of each hold-down component is sandwiched between a body portion of a main guard component and the cutter bar; (c) completing the securement of the plurality of main guard components and the plurality of corresponding hold-down components at a lower surface area of the cutter bar; and (d) inserting a knife back and attached knife sections into a receiving portion of a base portion and into slots of a main guard component, such that the knife back and attached knife sections are restrained from substantial upward/downward motion and from substantial forward/backward motion by the main guard component and a rear hold-down component.

The method may further involve after (a) and before (b), (e) securing a rear clip of at least one skid shoe over at least part of a rear transversely extending edge of a cutter bar.

The method may further involve after (b) and before (c), (f) inserting at least one skid shoe protrusion at a forward region of the skid shoe into at least one integrally formed clip of each main guard component to secure the skid shoe to the lower surface of the cutter bar.

The method may further involve after (d), connecting a knife head that is interconnected to the knife back to an output of a knife drive apparatus.

The disclosure also describes a cutting system for a harvesting header. The cutting system includes a transversely extending cutter bar, and first and second transversely extending knife backs interconnected to the cutter bar and being transversely aligned with each other, the first and second knife backs each having a main body portion. The cutting system also includes at least one knife section mounted to each of the first and second knife backs, each the at least one knife section having at least one knife edge extending generally in a forward direction, and a crop divider interconnected to the cutter bar and located between the first and second knife backs.

The cutting system may further include a plurality of knife guard components for co-operating with each the at least one knife section to cut crop material, each the knife guard component being interconnected to the cutter bar.

Other aspects and features will become apparent, to those ordinarily skilled in the art, upon review of the following description of the specific illustrative embodiments.

BRIEF DESCRIPTION OF THE DRAWINGS

FIG. 17 is an enlarged bottom view of some components of the cutting system of FIG. 13.

DETAILED DESCRIPTION

Figure 1:
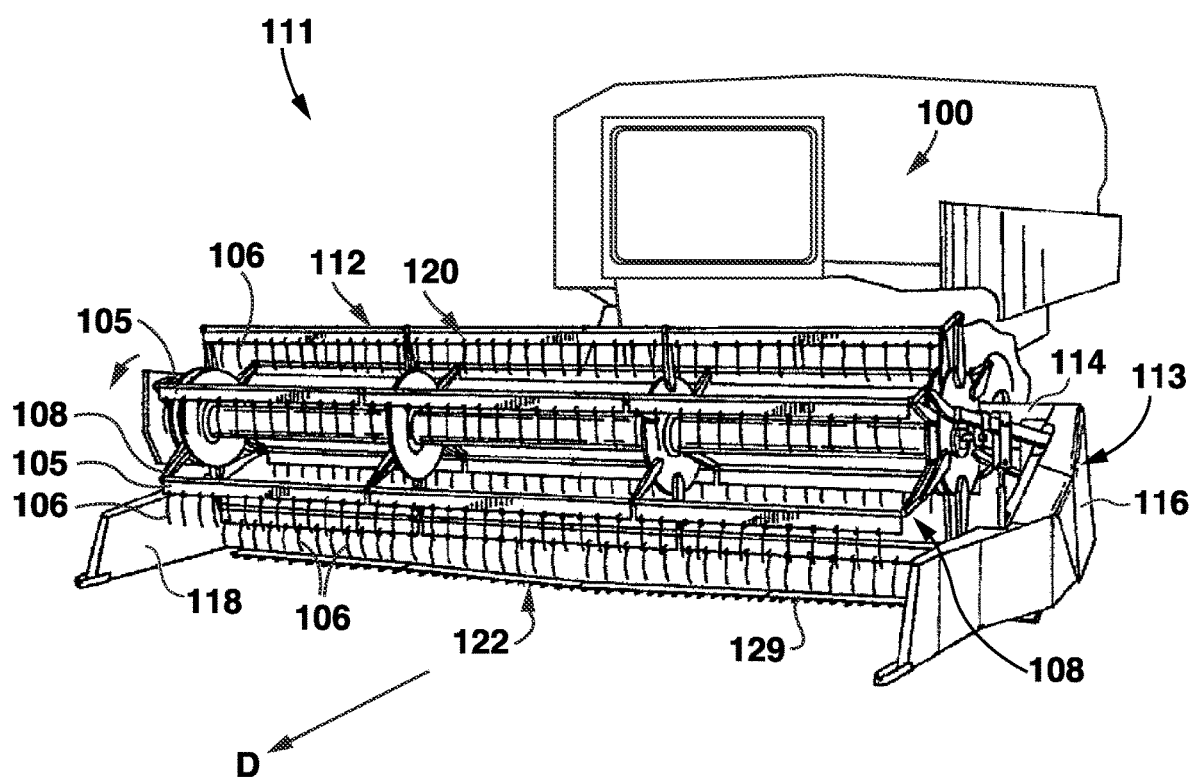
FIG. 1 is a front perspective schematic view of a representative combine harvester that may utilize the header of an embodiment.
Figure 1A:
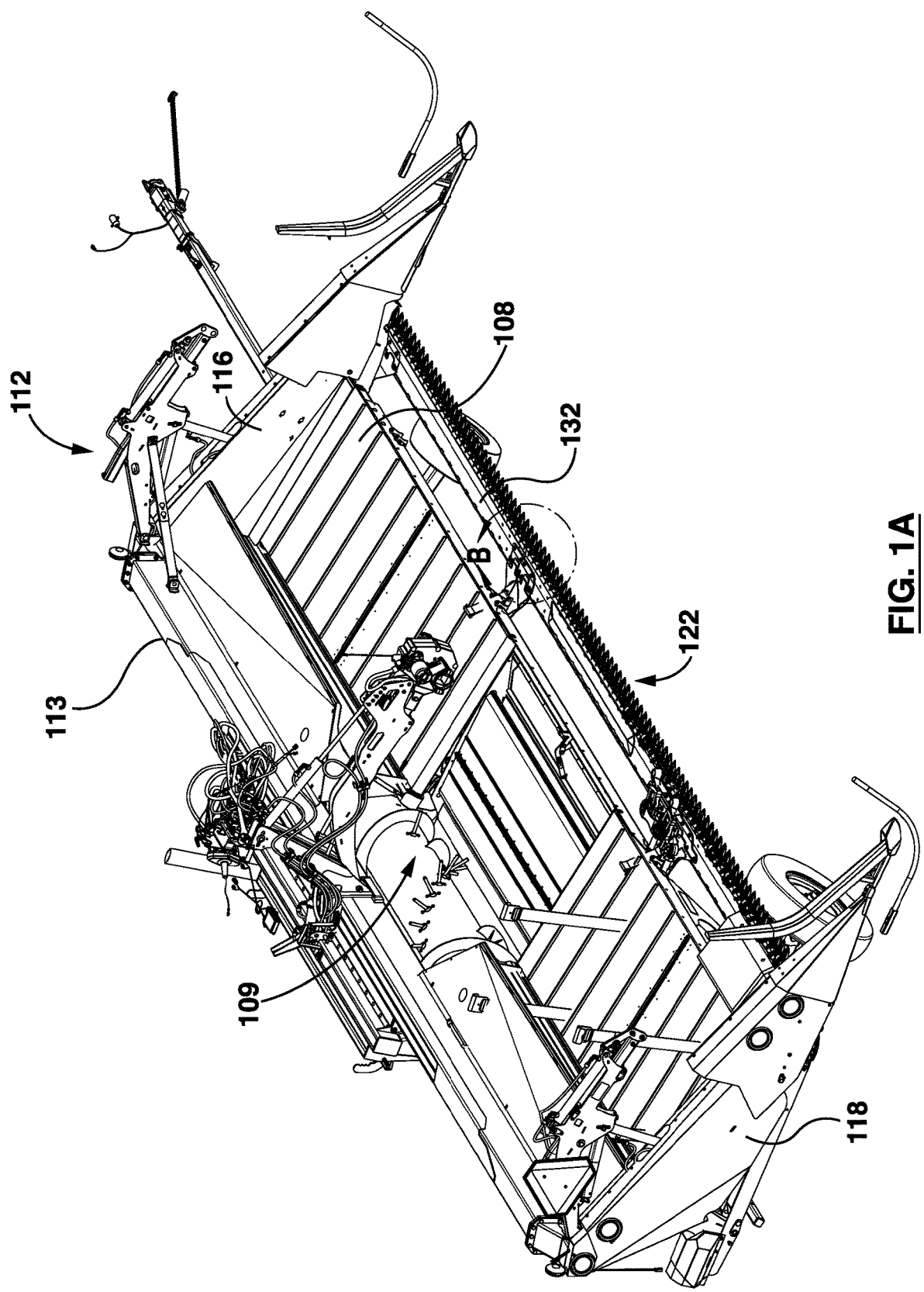
FIG. 1A is a front perspective view of the lower portion of a header with cutting system.

FIGS. 1 and 1A illustrates the general features of an illustrative combine harvester 111 and a header 112 thereof. Combine harvester 111 may have a propulsion unit 100 and attached at the front thereof, header 112. Header 112 may have a wide range of transverse lengths. By way of example only, header 112 may have a transverse length in the range of about 25 feet to 50 feet or more. Header 112 may include a generally transversely extending and oriented frame designated 113. Frame 113 may include a back frame portion 114 and side strut supports 116 and 118. Frame 113 may be made of any one or more suitable materials such as a hardened steel.

A reel 120 may be secured and operable for rotation to the side strut supports 116 and 118. A reel drive mechanism (not shown) may drive reel 120 (FIG. 1) in rotation about a transversely oriented reel axis. The reel drive mechanism may be any suitable mechanism known to those skilled in the art. Reel 120 may include a plurality of bats 105 angularly spaced and supported by radially extending arms 108 at one or more radial distances from the reel axis of rotation. Bats 105 may each include a plurality of fingers/tines 106 longitudinally spaced along each bat. Rotation of the reel 120 with bats 105 and their fingers/tines 106 assists crop material engaged by the combine harvester as it moves in a forward direction D (FIG. 1) being brought into contact with a cutting system 122 located at a forward, lower edge region of the header 112. Reel 120 with bats 105 and their fingers/tines 106 may also assist in moving crop material once cut by cutting system 122, onto a crop moving system 108 (such as a draper canvas) that may be located behind cutting system 122. Crop moving system 108 can then move the cut crop material to an intake or crop intake 109 (FIG. 1A) of combine harvester 111 for further processing. Crop moving system 108 may be any such system known to those skilled in the art, such as for example, a draper conveyor system (as shown in FIG. 1A).

Cutting system 122 may comprise one or more knife assemblies 129 driven in transverse reciprocating motion by a knife drive apparatus (not shown in FIG. 1). The transverse reciprocating movement of the knives of the knife assemblies 129 cut crop material that contacts the knives of knife assemblies 129, as the combine harvester 111 moves forward through crop material. Cutting system 122 may extend longitudinally substantially the entire transverse width of the header between the side strut supports 116, 118.

As shown in FIG. 1A, header 112 may support cutting system 122 including cutter bar 132 between side strut supports 116, 118 of frame 113.

With reference now to FIG. 1B, and FIGS. 2-8, cutting system 122 of header 112 may include a cutter bar 132, one or more knife assemblies 129, a knife head 138, a plurality of knife guard assemblies 125, and a knife drive apparatus or interface (shown only schematically only in FIGS. 2A and 3) designated generally 139. In addition to cutting system 122, header 112 may also include one or more skid shoes/plates 146 that may also extend in a transverse direction and forward/backward direction, and cover most if not substantially all of the lower surface area of the cutter bar 132. Skid shoes/plates 146 can be formed from any suitable wear resistant material such as a relatively strong and non-adhering plastic material like ultra-high-molecular-weight polyethylene (UHMW). A material that is strong as well as a material which does not tend to have crop material adhere to it, is desirable to provide impact absorption of the cutting bar impacting on the ground surface or nominal ground surface 134 (FIG. 2A), but which does not tend to have crop material adhere to it. Avoiding the build-up of crop material on the lower surface of the skid shoes/plates 146 is desired to avoid crop material creating additional height between the cutter bar and the other cutting components, and the level of the ground surface 134. Skid shoes/plates 146 may have rear clip 146a which may be received over at least part of the rear transversely extending edge 132a of cutter bar 132.

Cutting system 122 may be configured to provide a sandwich-like assembly in which several components are held together in a multiple layer configuration. Cutting system 122 may also provide an upper surface area over which crop material passes during operation, stretching from the forward tip of knife guard assemblies 125 onto the cutter bar 132, that is generally flush/smooth/planar (apart possibly from relatively low profile fasteners/nuts used in at least some embodiments to secure various components together as described below). This relatively smooth upper surface area allows for a relatively unimpeded movement of crop material across the upper surfaces of the knife guard assemblies 125 onto the upper surface of the cutter bar 132 and then onto the moving apparatus 108 (FIG. 1) that can move the cut crop material to, for example, the intake of the combine harvester 111.

Figure 1B:
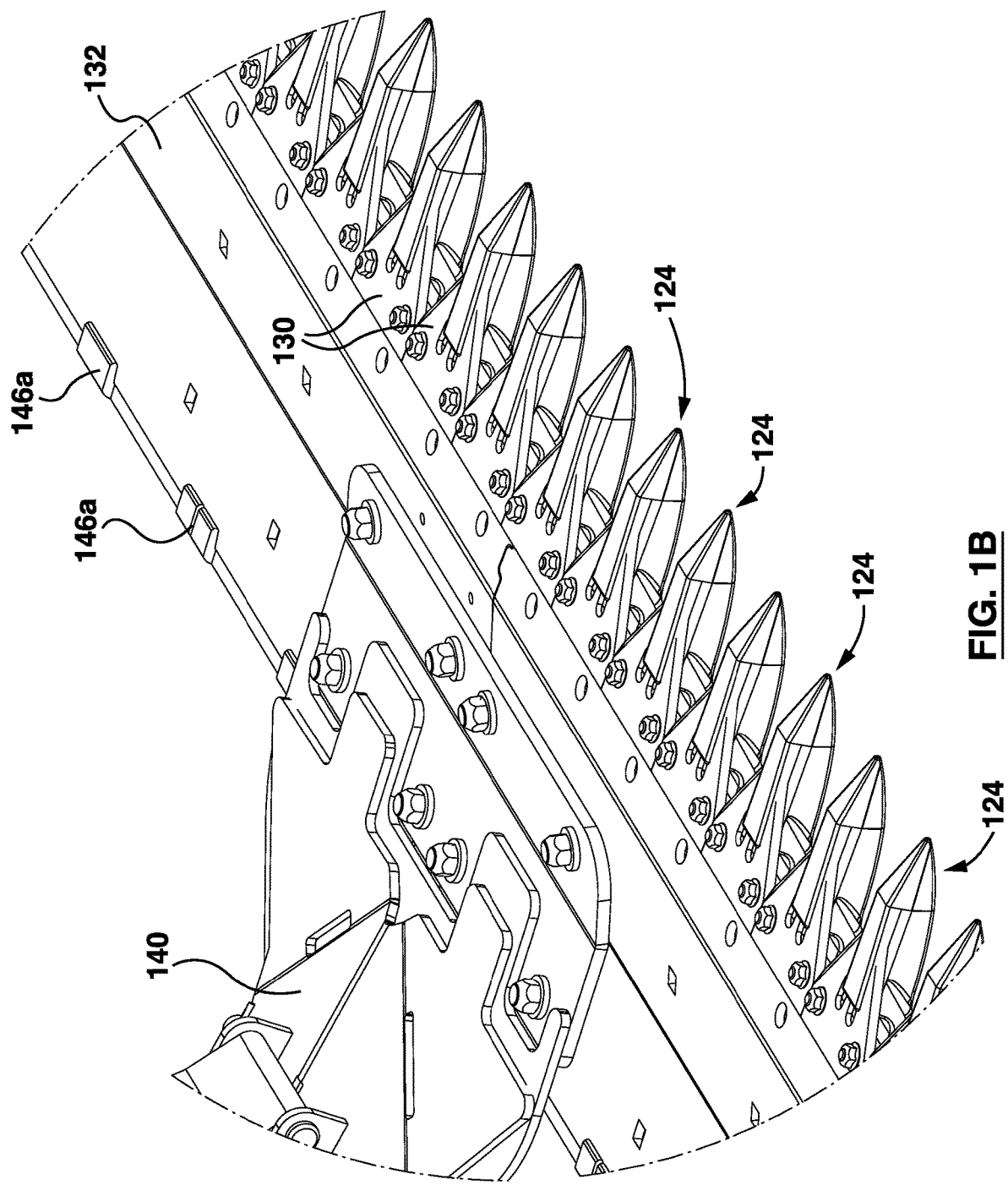
FIG. 1B is an enlarged view at "B" in FIG. 1A.
Figure 2:
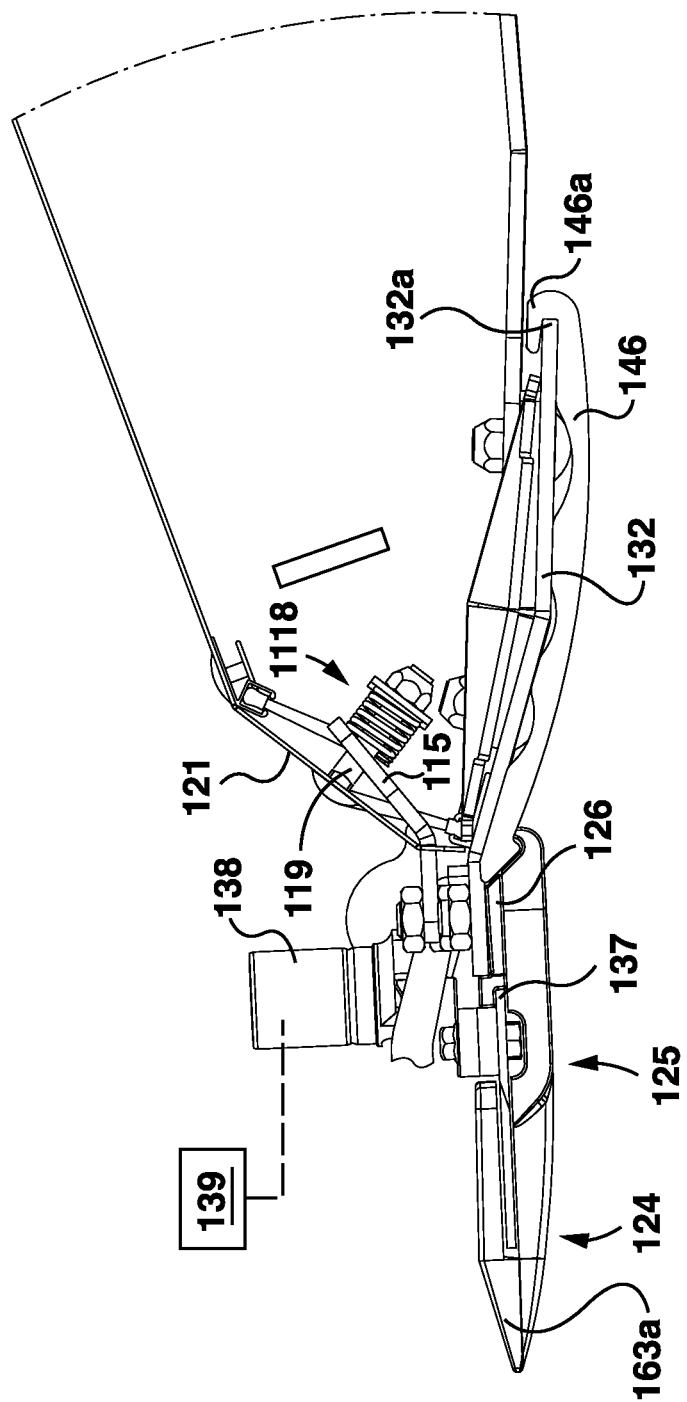
FIG. 2 is a side view of the cutting system of FIG. 1A.
Figure 2A:
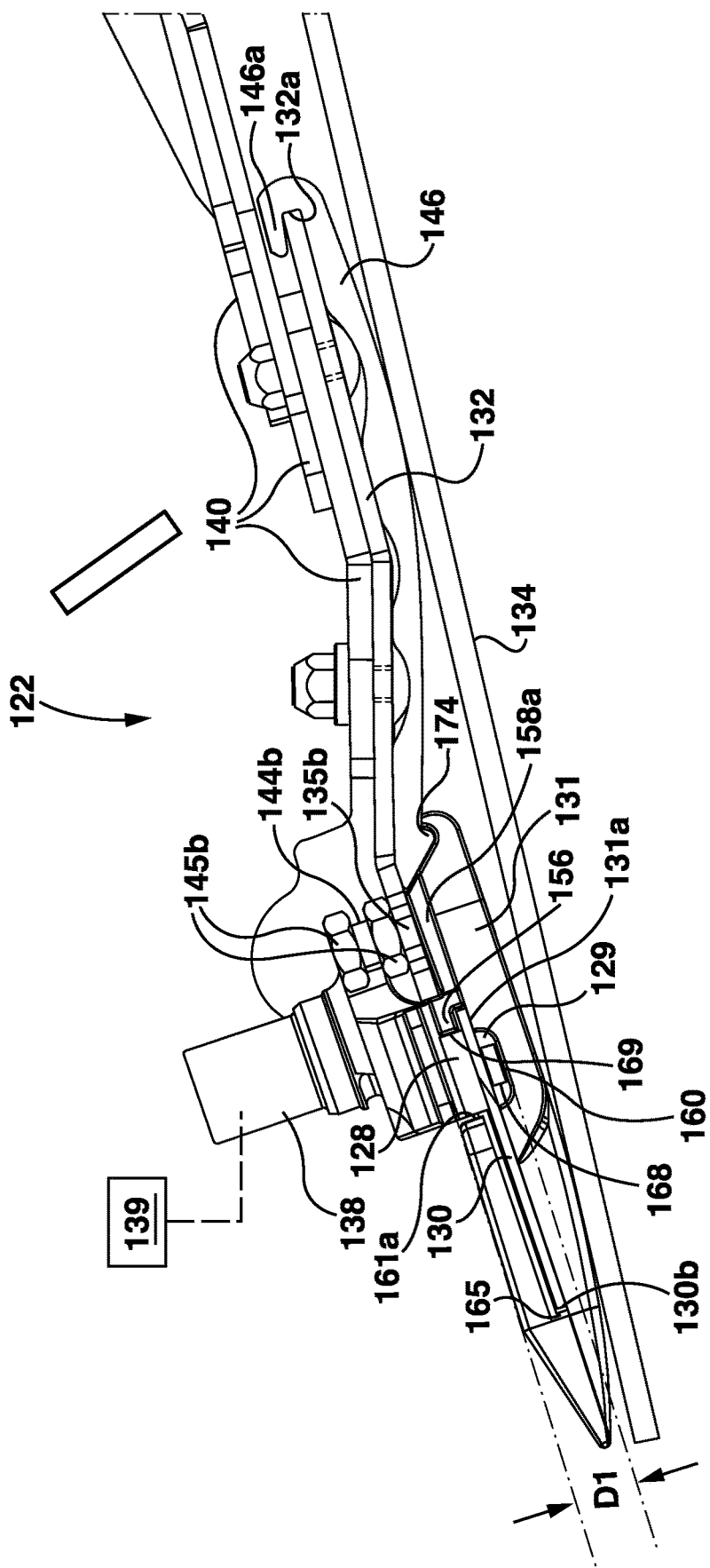
FIG. 2A is an enlarged view of the cutting system of FIG. 2 without cover element and retaining mechanism.

With reference to FIGS. 1, 1A and 1B, cutter bar 132 may be mounted to frame 113 and extend longitudinally in a transverse direction, for example extending between side strut supports 116, 118. Cutter bar 132 may also be supported by spaced frame support components 140 of frame 113 which may be oriented longitudinally (ie. orthogonal to the transverse orientation of the cutter bar 132) and be interconnected to back frame portion 114 of frame 113. Cutter bar 132 may be the main, if not only, structural support element to which other components of cutting system 122 are interconnected. As seen in FIG. 2A, the position and orientation of the cutter bar 132 defines the position and orientation of skid shoes/plates 146 and the height of the knife assembly 129 and knife guard assembly 125 above the level of the ground surface 134.

Figure 3:
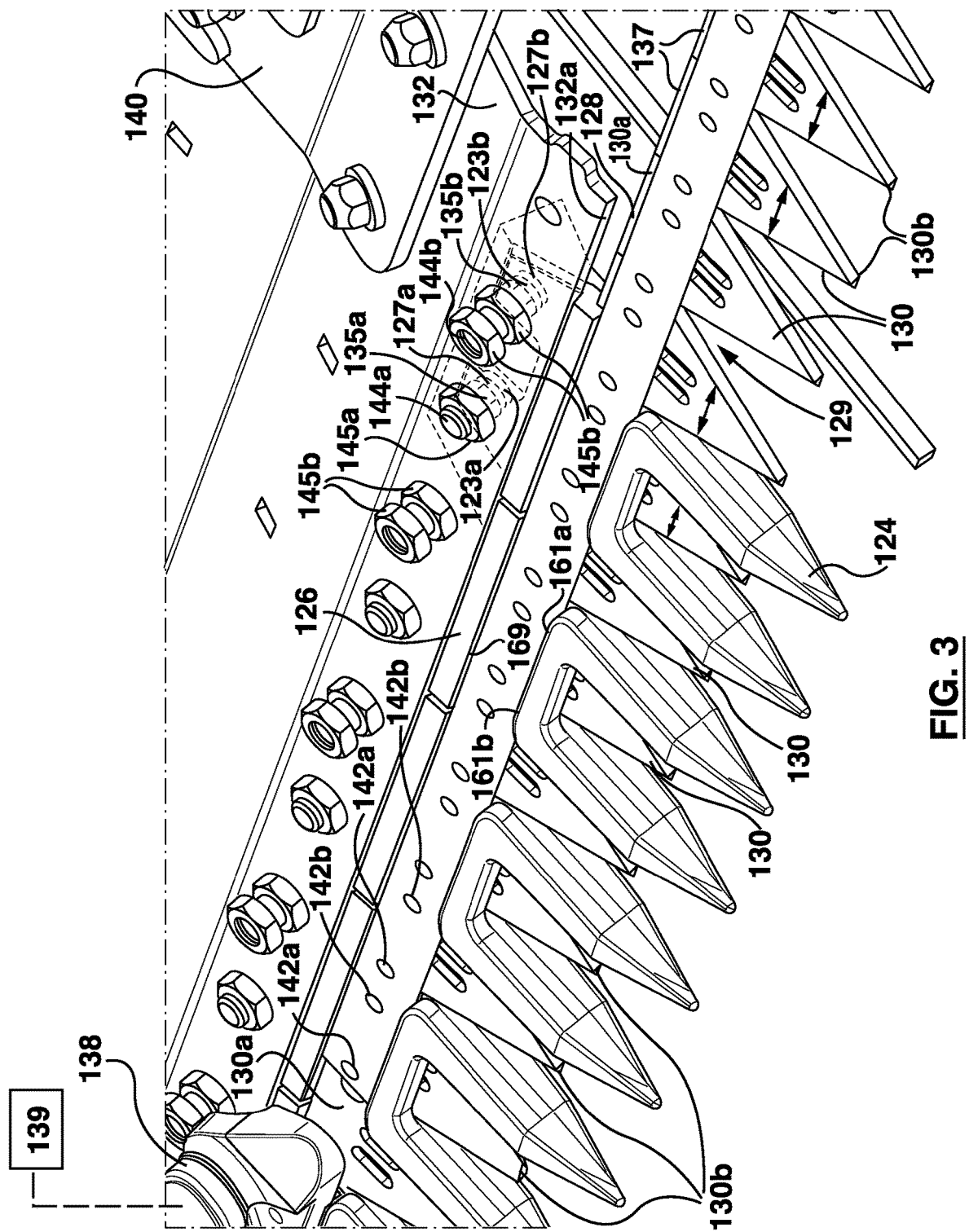
FIG. 3 is a top perspective view of part of the cutting system of FIG. 2.

Cutter bar 132 may be constructed from any one or more suitably strong and wear resistant materials. For example, cutter bar 132 may be a roll formed section of high strength steel with for example, a shallow S or Z bend profile (see for example the side profile view in FIG. 2). Cutter bar 132 may be a single piece of steel secured, for example by welding and/or with bolts, to a lower portion of the frame 113 of header 112 including lower frame support components 140 (FIGS. 1B and 3). Cutter bar 132 may be designed to be used for a significant amount of time (eg. for the projected life span of header 112) without significant amounts of repair work being required. In some designs, cutter bar 132 may be formed in discrete sections, with sections being bolted on to the frame support components 140. Providing a cutter bar 132 that is formed in discrete, easily removable sections, facilitates the manufacturing and use of varying length/sized cutter bars with common parts and/or it can facilitate easier repair.

Cutter bar 132 may have a straight, square forward edge 132a (FIG. 3) for the length of the header, and the body of the cutter bar 132 may be perforated with a pattern of vertically oriented holes/openings for mounting the knife guard assemblies 125 and knife assemblies 129. It is desirable that this cutter bar edge 132a remain substantially straight and square during operation for proper performance of the components of the cutting system 122, including the movement of knife sections 130 within and through the main guard components 124 of knife guard assemblies 125. There may be some flexing upwards/downwards of the cutter bar 132 along its length during operation (eg. when the header moves across uneven ground surfaces). Also, in some embodiments, a cutter bar may be mounted so that it can move vertically upwards and downwards to some extent relative to the header frame (eg. the cutter bar can float relative to the ground surface to follow a varying level of ground surface 134). In such embodiments, one or more additional transversely extending cover plate elements or feather plates 121 (FIGS. 2, 2B and 4) may be attached to and move vertically up and down with the cutter bar, to bridge a changing gap between the cutter bar and the transversely extending edge of the crop moving apparatus 108.

Figure 4:
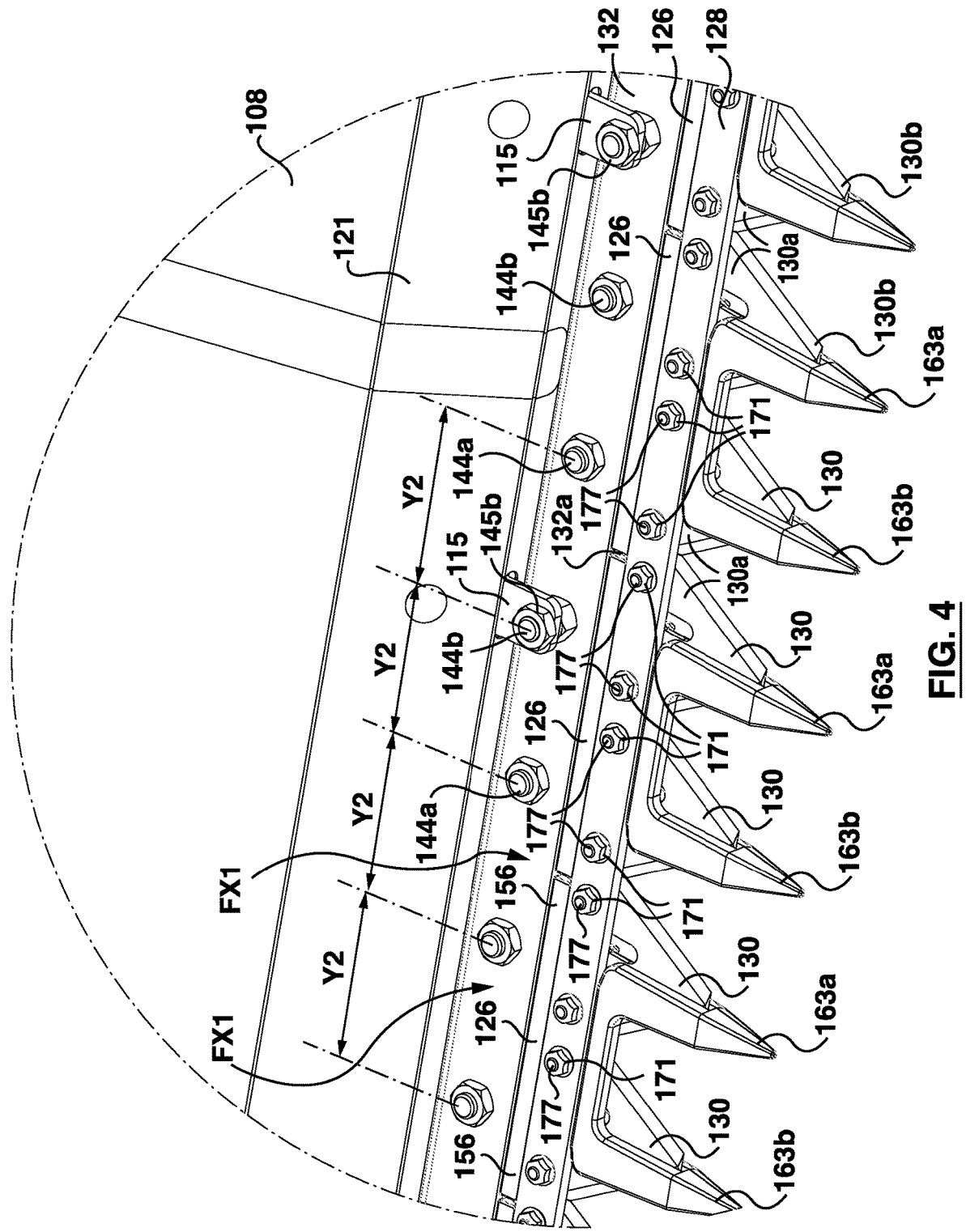
FIG. 4 is another top perspective view of part of the cutting system of FIG. 2.

With reference now to FIGS. 2-7, a plurality of knife guard assemblies 125 are mounted at spaced transverse intervals to and along cutter bar 132. Each knife guard assembly 125 may comprise a main guard component 124 and a rear hold-down component 126. Each combination of main guard component 124 and rear hold-down component 126 may be secured together in a co-operative configuration onto cutter bar 132. For example, guard bolts 144a, 144b may be received through respective aligned, openings 123a, 123b in main guard component 124 (FIGS. 5-7), and through openings 127a, 127b in rearward extending leg portions 158a, 158b of rear hold-down component 126 (FIGS. 6-7), and through corresponding openings 135a, 135b of cutter bar 132 (FIGS. 3 and 4). Openings 135a, 135b may be constantly spaced along the length of cutter bar 132 (eg. spaced at distance Y2 in FIG. 4).

Bolts 144a, 144b may have nuts 145a, 145b on the upper surface to secure the bolts in position. In the embodiment as illustrated in FIGS. 2-4, bolts 144b are shown with double-stacked nuts 145b. Only the lower nut 145b of the stacked nuts 145b is required to secure the bolts 144b in position and clamp each knife guard assembly 125 to cutter bar 132. In a flexible cutter bar embodiment as referenced above, the upper nut 145b may be used to secure a cover plate elements 121 to cutter bar 132 so that the cover plate element may move with the cutter bar, to bridge the changing gap between the cutter bar and the transversely extending edge of the crop moving system. Cover elements 121 may connect cutter bar 132 to cover elements 121 with plate members 115, spring mechanism 1118 and bolt 119 (FIGS. 2 and 2B) to provide a resilient hold-down of the cover plate against a forward edge region of moving apparatus 108.

Figure 5:
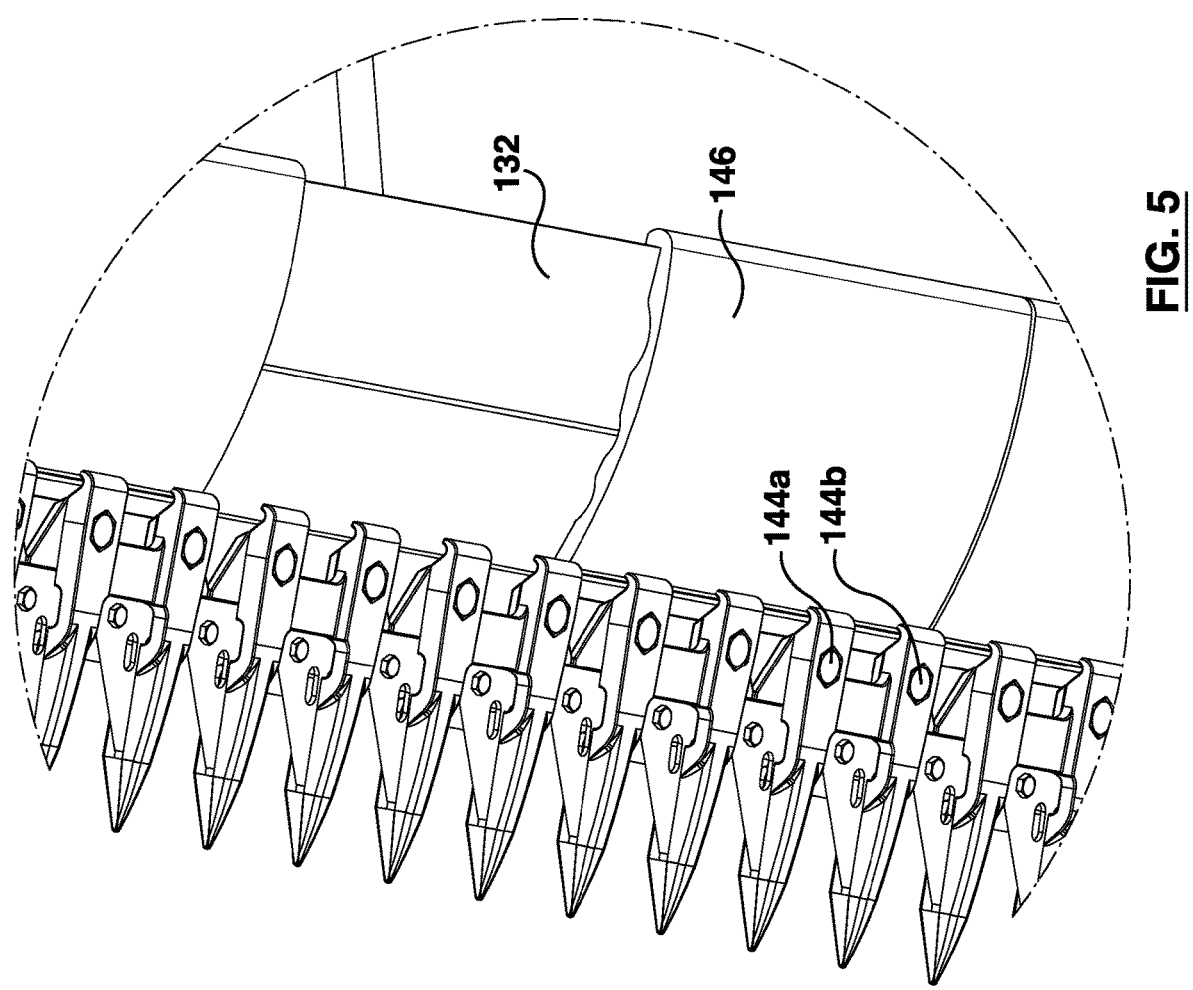
FIG. 5 is a bottom perspective view of part of the cutting system of FIG. 2.
Figure 7:
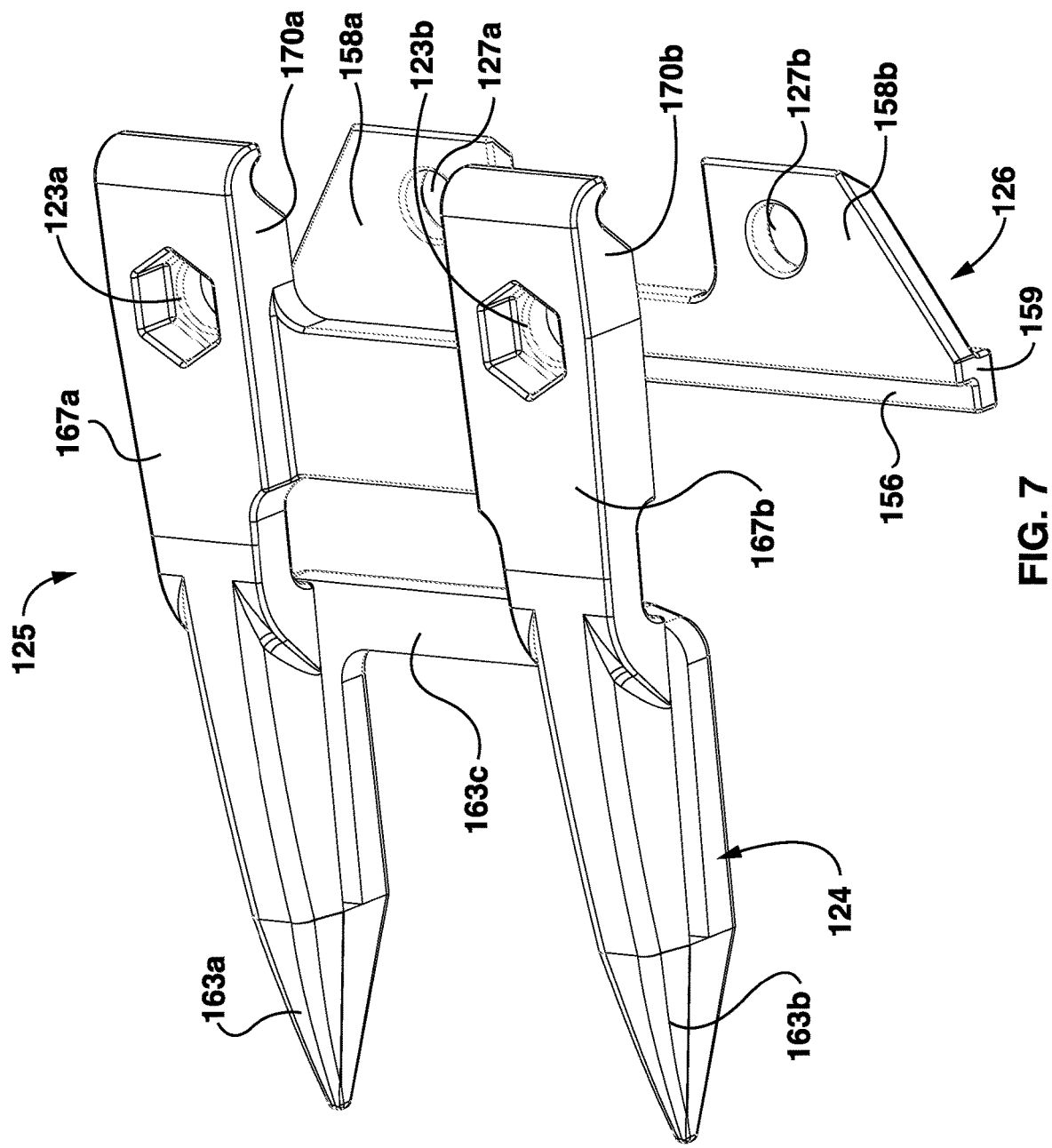
FIG. 7 is lower perspective view of the components of FIG. 6.

With particular reference now to FIGS. 5 and 7, bolts 144a, 144b, may have bolt heads that are hex shaped. The hex heads of bolts 144a, 144b may be received within correspondingly shaped recesses at openings 123a, 123b, in the lower surfaces of leg portions 170a, 170b of main guard components 124 and have outward facing surfaces that are substantially flush with, or recessed above, the bottom surfaces 167a, 167b, of respective leg portions 158a, 158b of hold-down component 126. This configuration may allow for ease of assembly, and a substantially smooth lower surface region of main guard components 124, which can reduce the degree of wear on the bolt heads of bolts 144a, 144b.

Each main guard component 124 may have a base portion 131 (FIG. 6) in the region where it is mounted to cutter bar 132 with a dimension Y1, that when mounted, occupies a transverse length portion of the cutter bar that is for example about 4¼ inches along the length of cutter bar 132. The main guard components 124 may also have base portions 131 in the region where they are mounted to cutter bar 132, spaced apart from each other along the length of the cutter bar 132. For example, the main guard components 124 may have base portions 131 which, when mounted to cutter bar 132, are spaced with a modestly size gap (eg. about 2 inches) between adjacent main guard components 124.

Figure 3A:
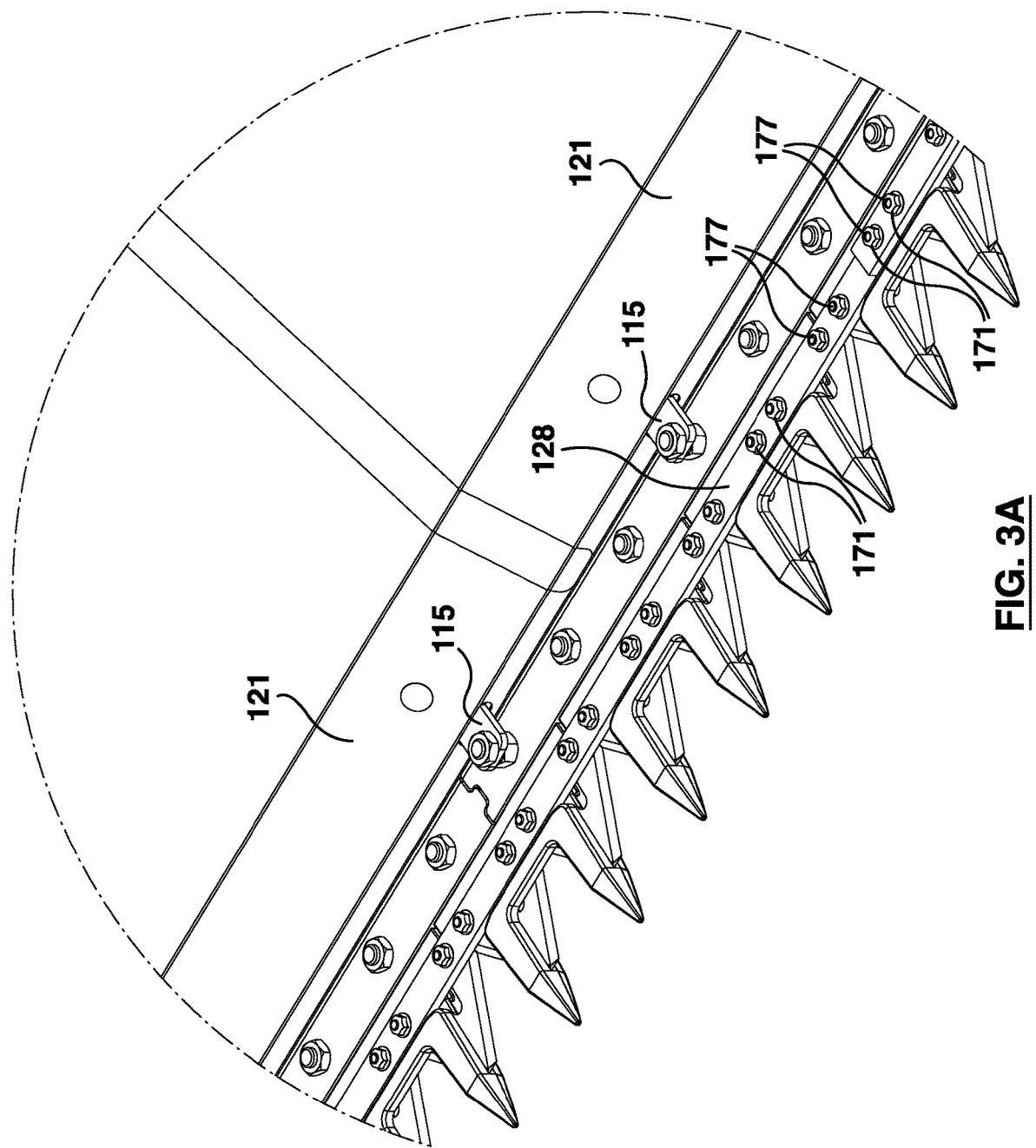
FIG. 3A is a similar view to FIG. 3 also showing cover elements.

Each main guard component 124 may in addition to having a base portion 131, have a knife back receiving portion 160 and a forwardly positioned, double-fork cutting portion 162. Cutting portion 162 has spaced forwardly extending cutting forks 163a, 163b having respective upper portions interconnected by a transversely oriented upper strut member 163c (FIG. 7). Upper strut member 163c can provide additional strength to resist forces imparted upon the forks 163a, 163b in a transverse direction. Such transverse forces may result when the main guard component 124 impacts a rock during use. The dimension Y2 (FIG. 6) of the cutting forks 163a, 163b may be about 3⅞ inches and this area of the cutting forks is what can provide a substantial amount of hold-down area and resultant force on cutting sections 130 and thus on the knife back 128 attached thereto. In the illustrated embodiment, by not having a portion of the knife forks 163a, 163b and strut member 163c, located above the upper surface of knife back 128, the interface of surfaces can be kept substantially flush (see FIGS. 2A, 3 and 3A).

Figure 9:
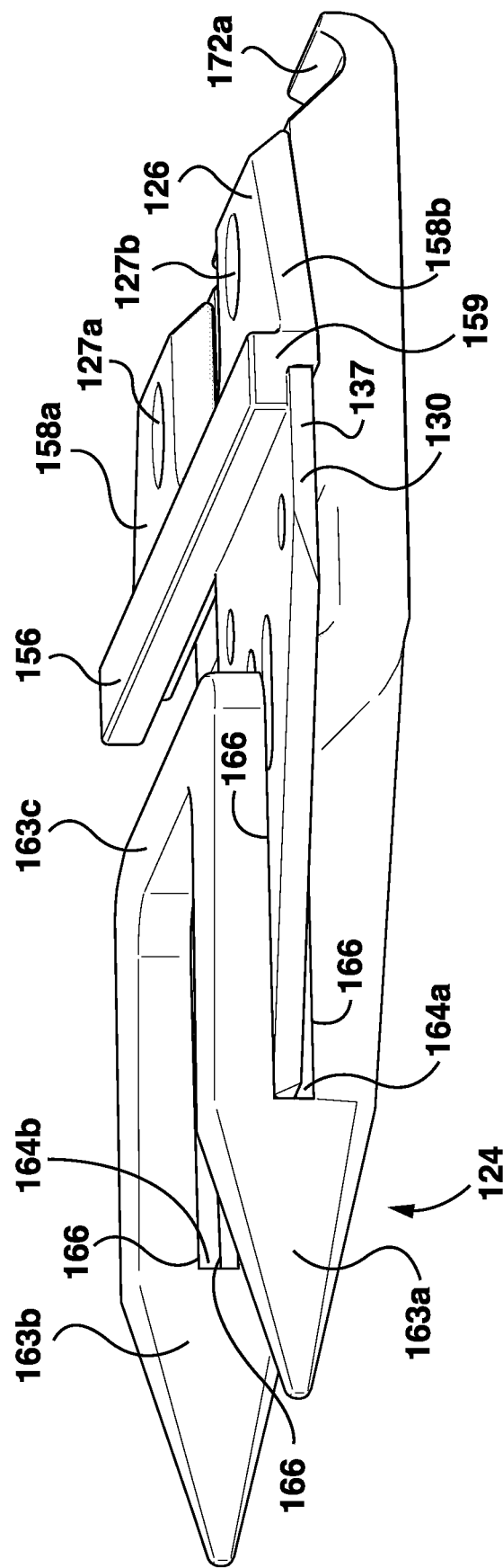
FIG. 9 is side perspective view of some components of the cutting system of FIG. 2.
Figure 10:
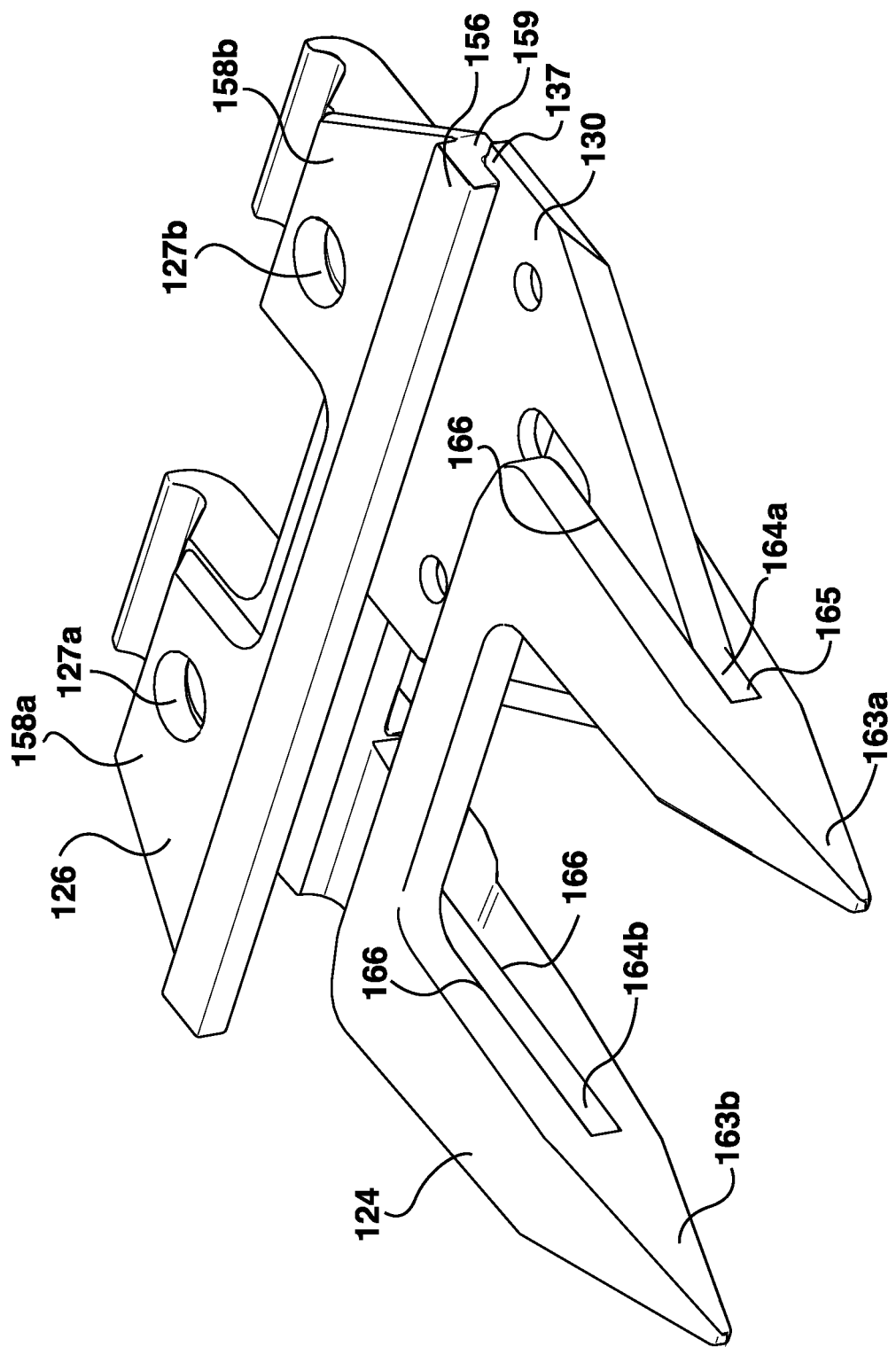
FIG. 10 is a top perspective view of the components of FIG. 9.

With reference also to FIGS. 9 and 10, each cutting fork 163a, 163b has a respective narrow, longitudinal and transverse slot 164a, 164b between the upper and lower portions of the forks 163a, 163b. The transverse slots 164a, 164b may have a closed forward end and an open rearward end. Slots 164a, 164b have dimensions suitable for receiving therein and there through in transverse reciprocating movement, knife sections 130 mounted/otherwise connected to knife back 128 (not shown in FIGS. 9 and 10). The amount of transverse movement of the knife sections will be dependent upon the stroke length of the reciprocating movement provided by the knife drive apparatus 139 (not shown in FIGS. 9 and 10). For example in an embodiment, the stroke length may be about three inches. Each stroke may be a cutting stroke. Each knife section 130 may only move part way through slots 164a, 164b of forks 163a, 163b in reciprocating transverse movement.

Knife drive apparatus 139 may be any known suitable knife drive apparatus, such as for example a known type of hydraulic or mechanical drive. Knife drive apparatus 139 may translate power derived from a central location on the harvesting header to an outer end of the harvesting header, where reciprocating motion may be applied to a knife head 138 (not shown in FIGS. 9 and 10) to cause the interconnected knife back 128, and the cutting knife sections 130 attached thereto, to move transversely back and forth within and through the slots 164a, 164b, in the main guard components 124 and cut crop material that comes into contact or close proximity with the cutting components. An example of a knife drive apparatus that may be employed is disclosed in Applicant's own U.S. patent application Ser. No. 14/889,811 filed Jun. 9, 2015 and published under United States patent publication no. US 2016/0174460 on Jun. 23, 2016, the entire contents of which are hereby incorporated herein by reference.

Figure 11:
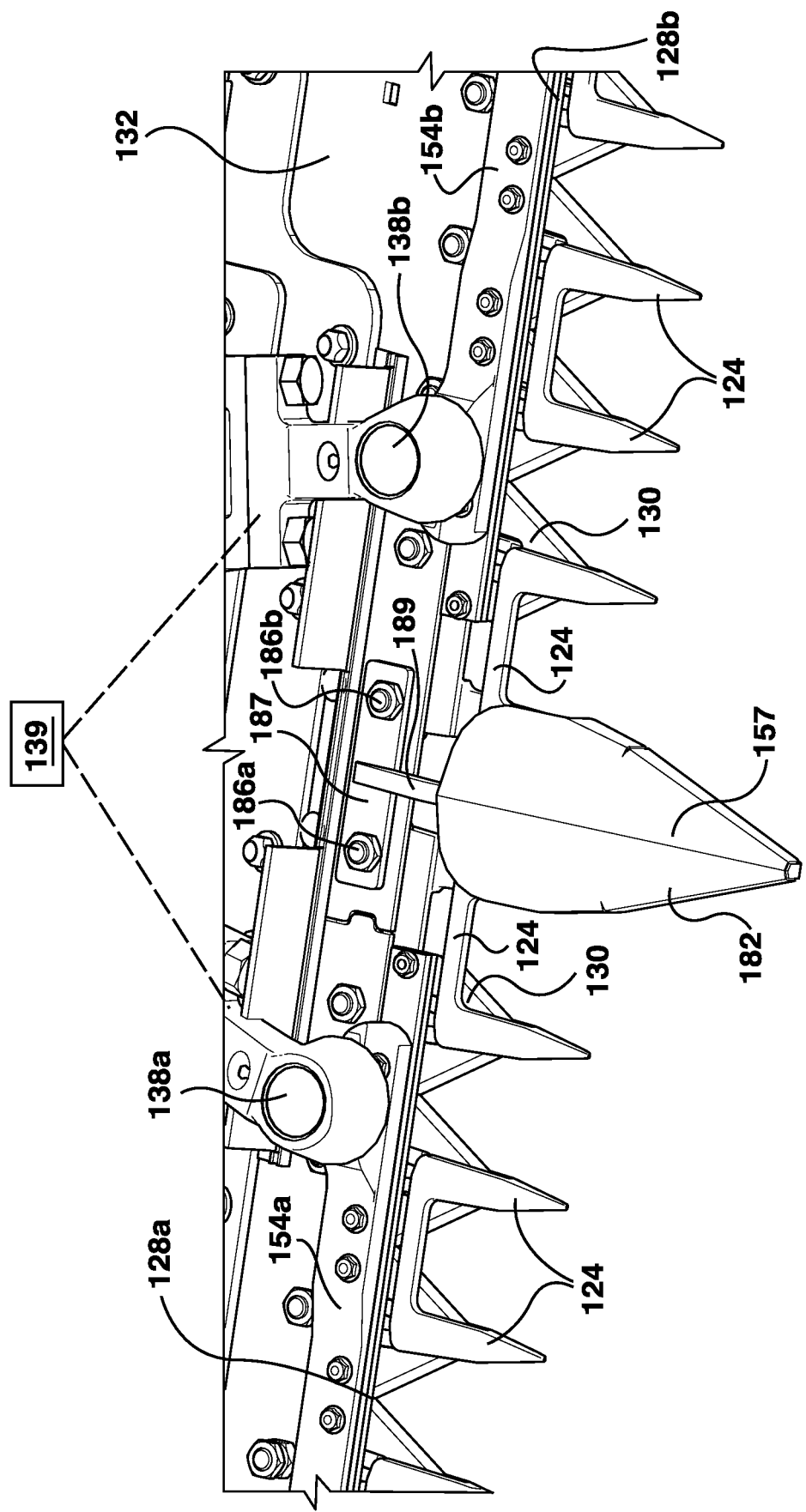
FIG. 11 is a top perspective view of part of a cutting system.

As shown schematically in FIG. 11, a knife drive apparatus 139 may be interconnected to knife backs 128a, 128b on opposed transverse sides of the knife drive mechanism. Each knife back 128a, 128b may have its own knife head 138a, 138b and the knife backs 128a, 128b may be driven 180 degrees out of phase with each other. A crop divider device 157 may be located between the knife backs 128a, 128b and permit crop material to be channeled to one side or the other. The crop divider device 157 may help to avoid a gap in cut crop between knife sections 130 of knife backs 128a, 128b. In this way, it is not necessary to provide for overlap in movement between the adjacent knife sections 130 of knife back 128a, 128b. This may be desirable since overlapping movement of adjacent knife sections may result in interference between the knife sections and/or may be difficult to maintain in working order. Crop divider device 157 may be mounted to cutter bar 132 with bolts.

Figure 12A:
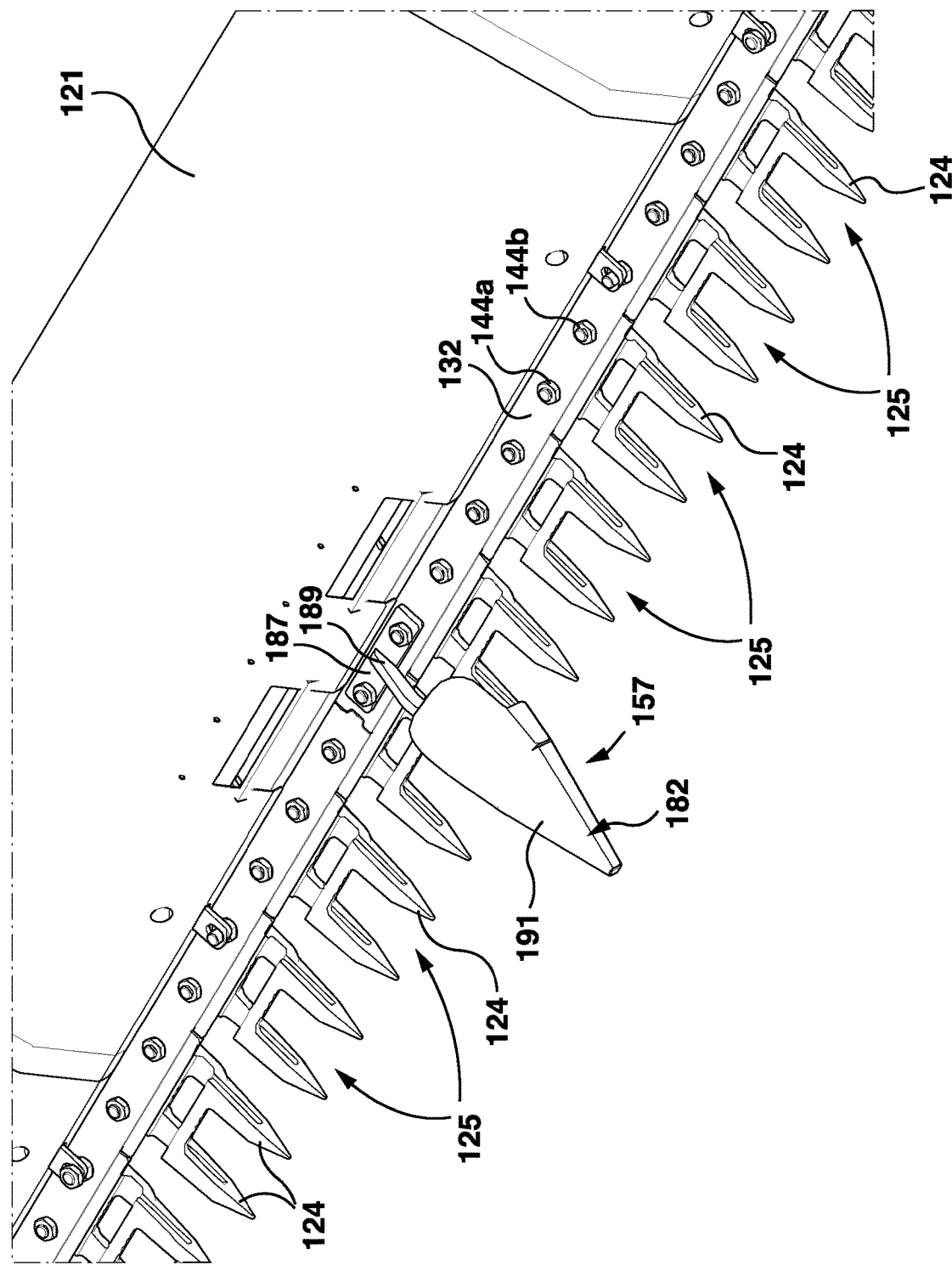
FIGS. 12A, 12B and 12C are upper perspective views of some of the components of the cutting systems of FIG. 2.
Figure 12B:
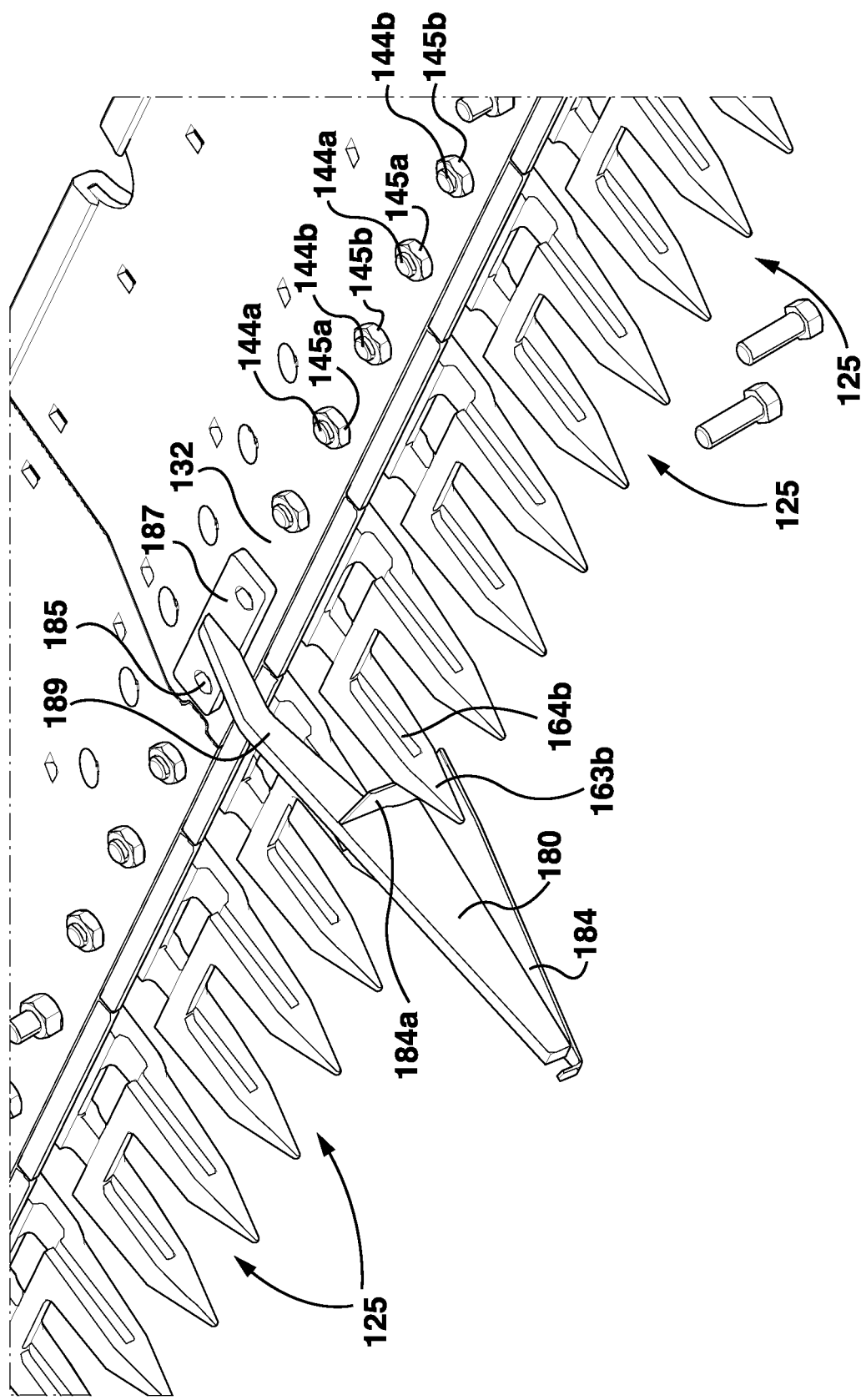
Figure 12C:
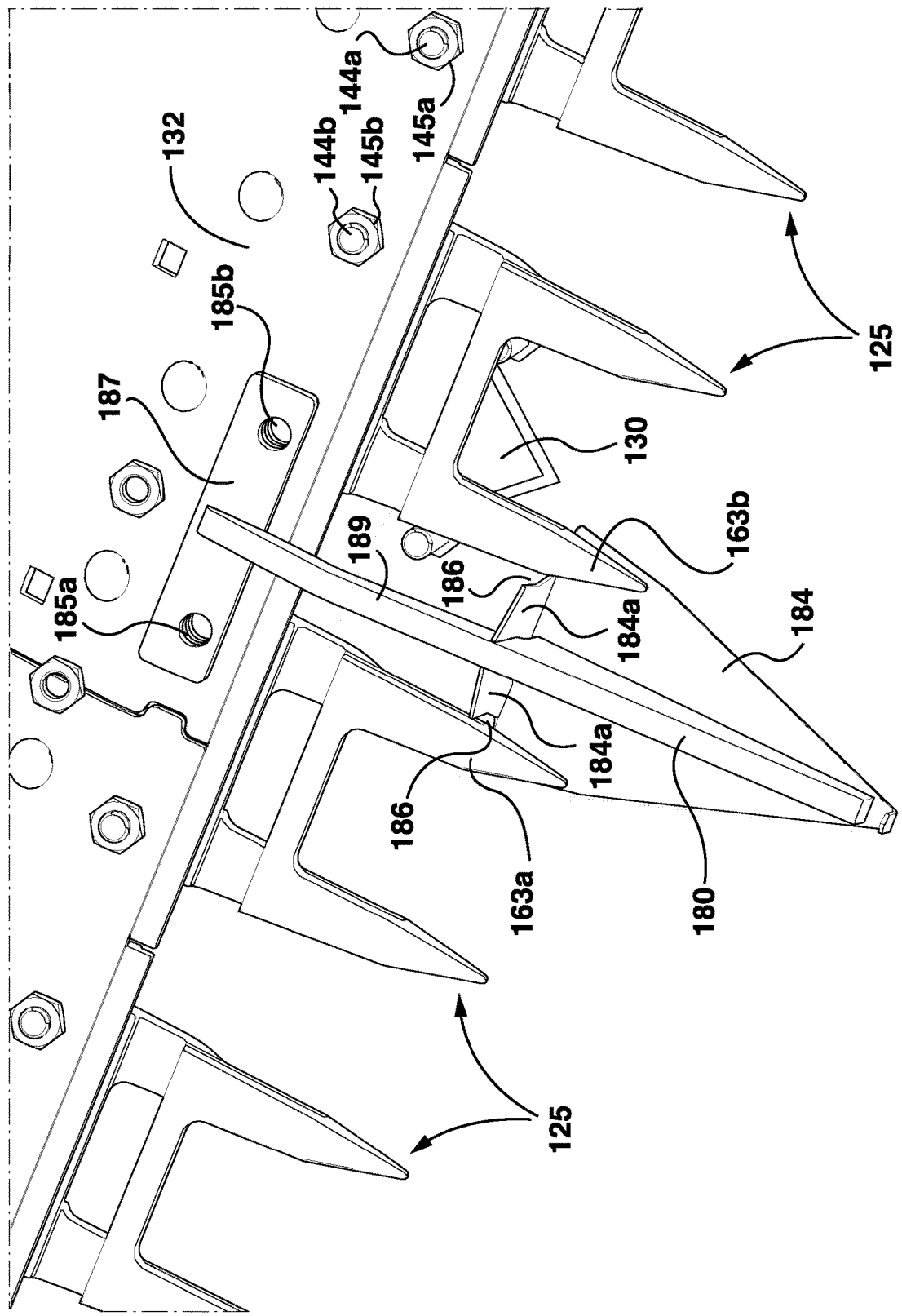
Figure 13:
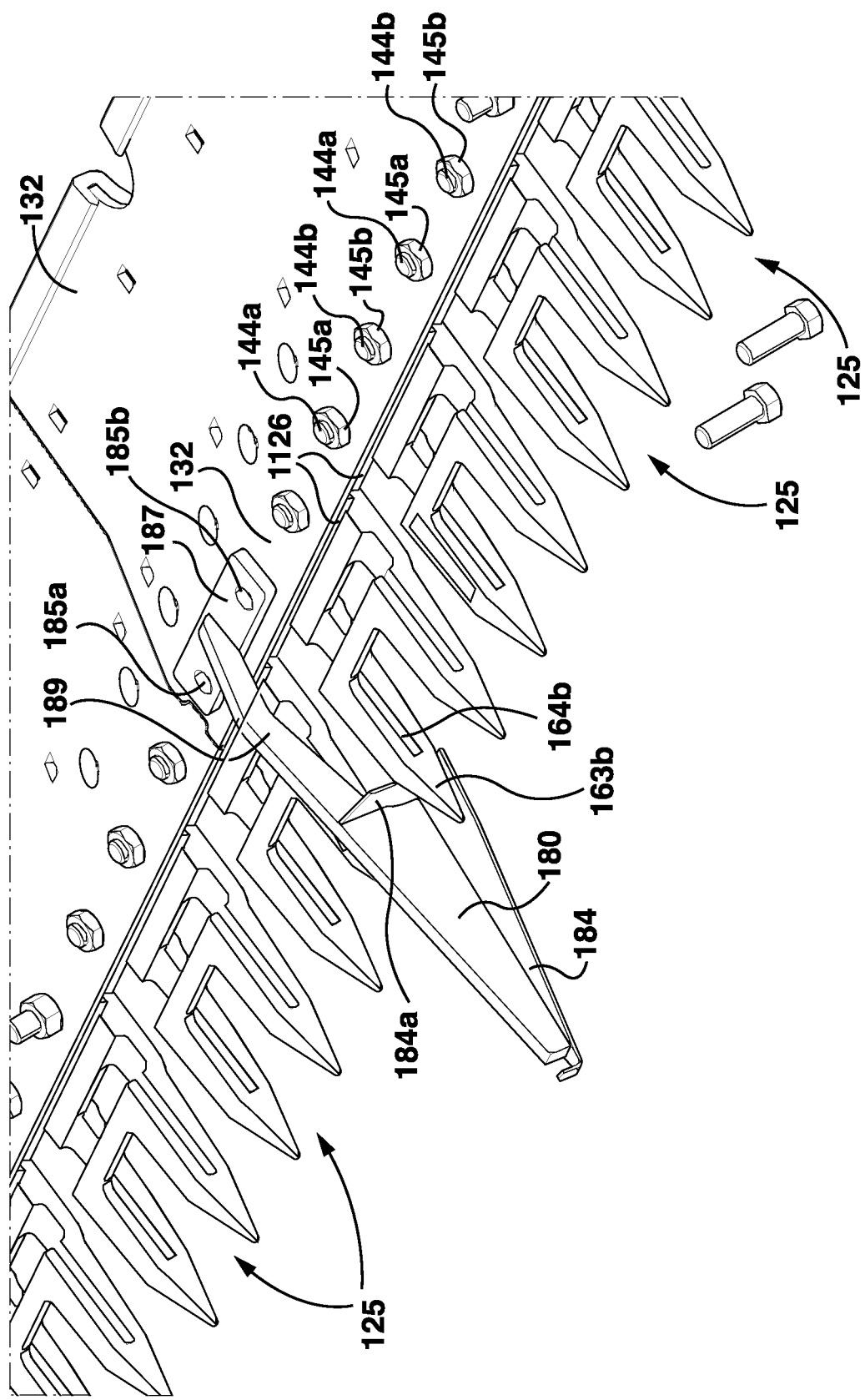
FIG. 13 is an upper perspective view of a variation of some of the components of the cutting system of FIG. 2.
Figure 13A:
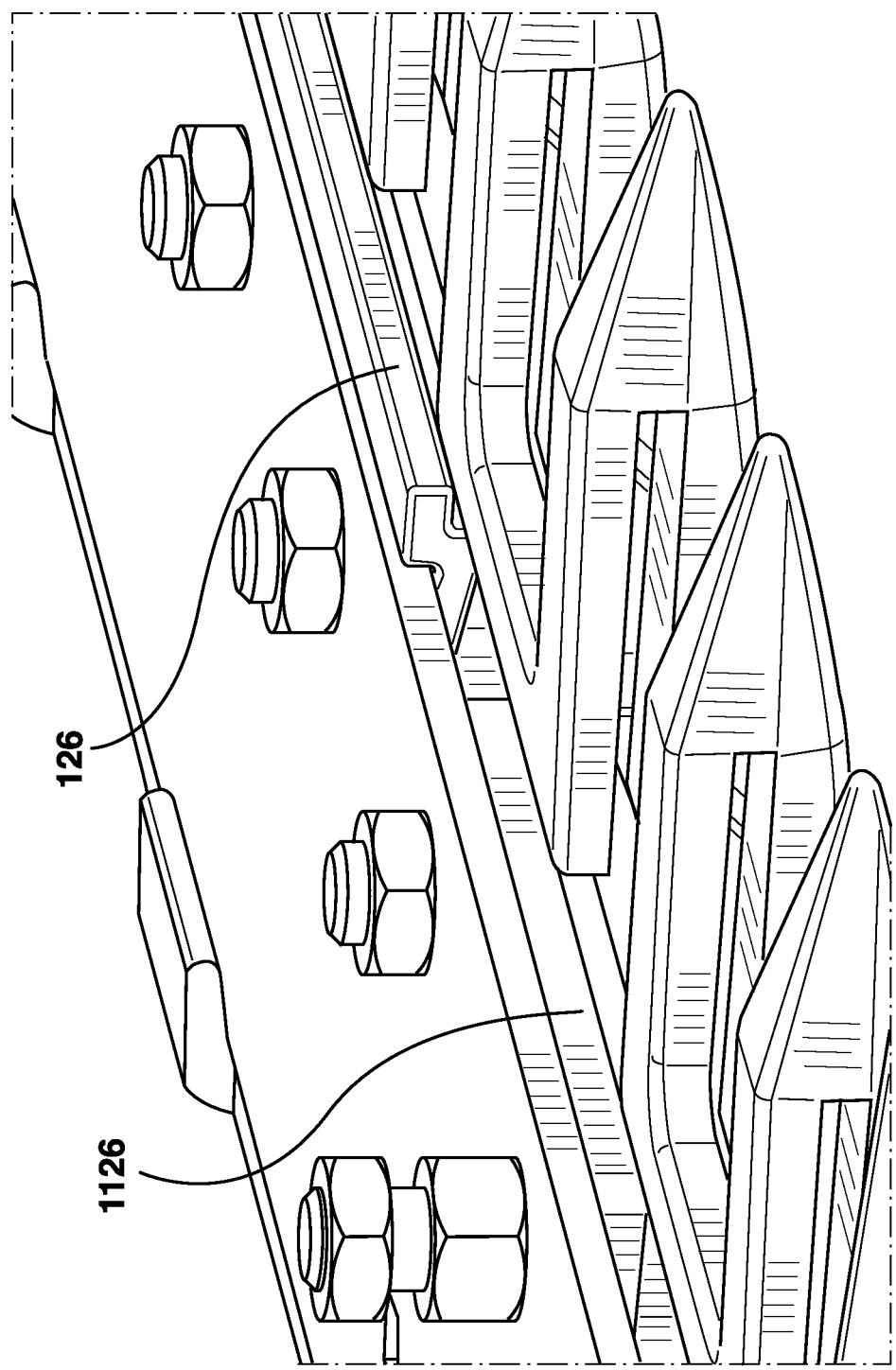
FIG. 13A is a an enlarged upper perspective view of the variation of components of a cutting system in accordance with FIG. 13.
Figure 14:
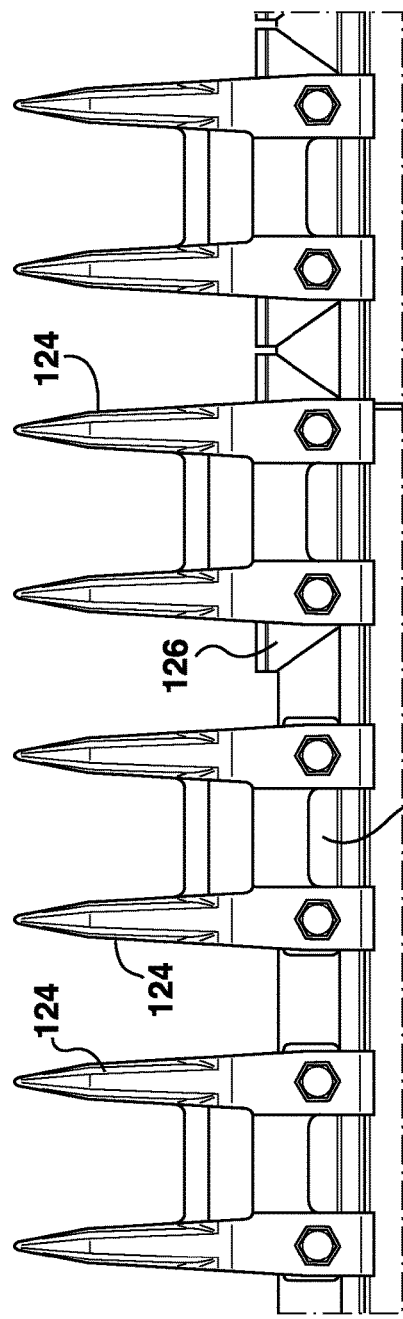
FIG. 14 is a an enlarged bottom plan view of the variation of components of a cutting system in accordance with FIG. 13.
Figure 15:
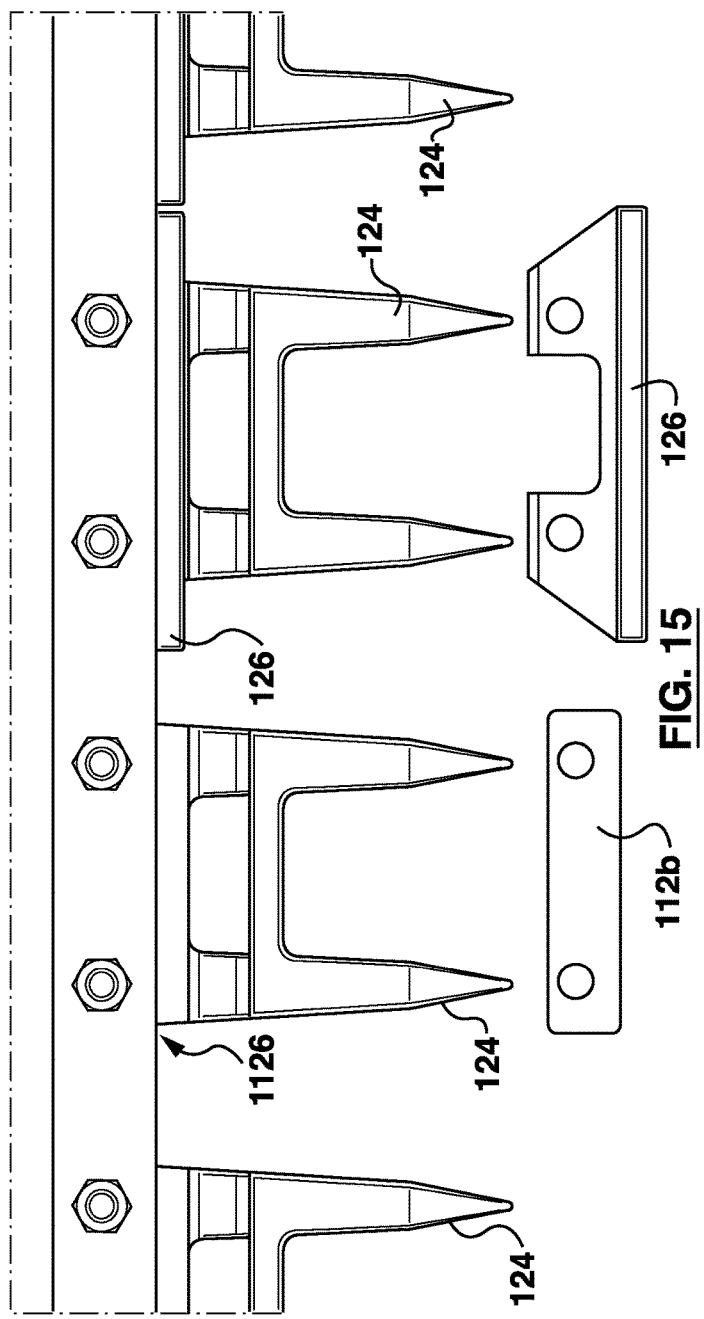
FIG. 15 is a an enlarged top plan view of the variation of components of a cutting system in accordance with FIG. 13.
Figure 16:
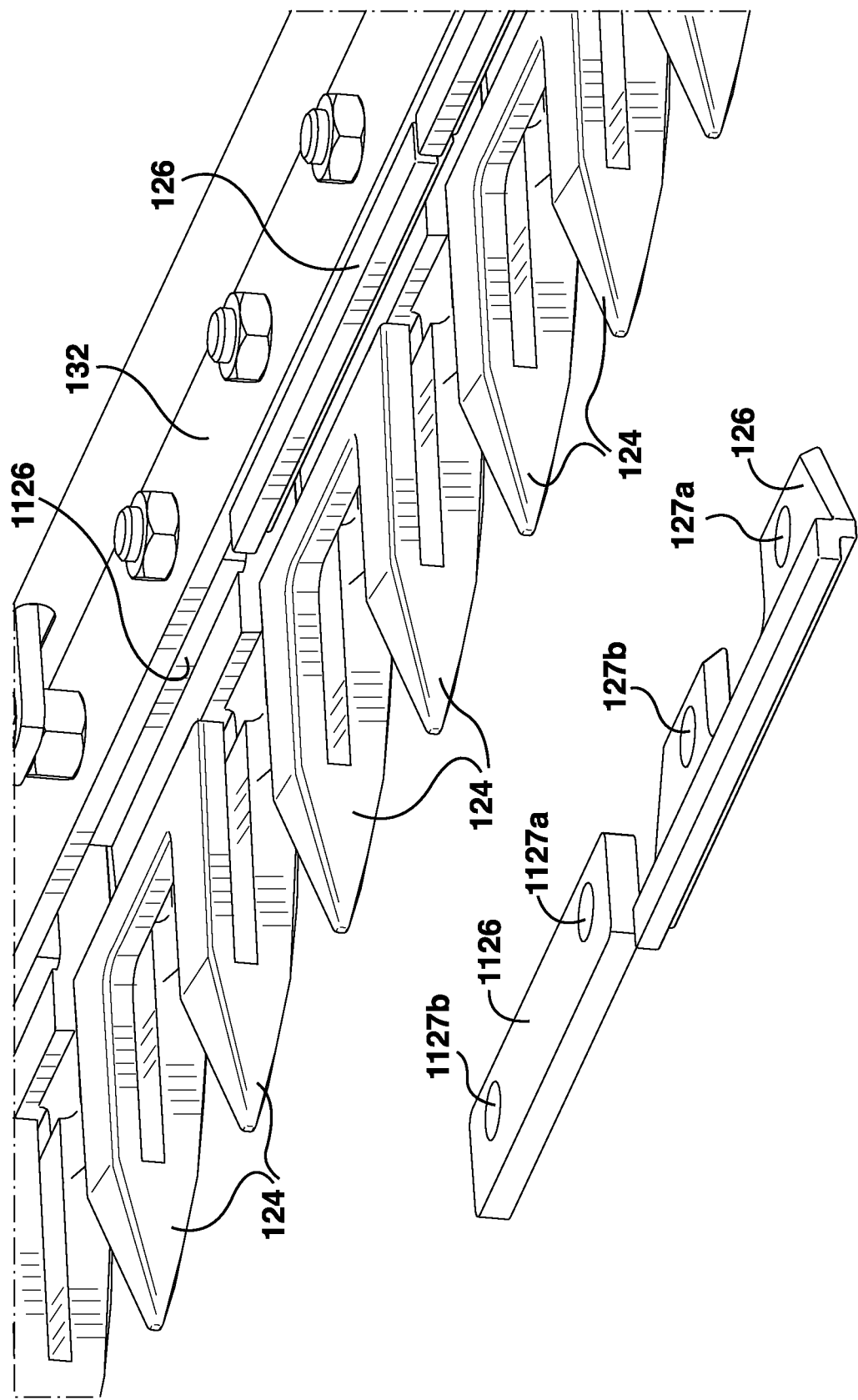
FIG. 16 is a an enlarged perspective view of the variation of the components of a cutting system in accordance with FIG. 13.

As shown in FIGS. 12a-12c, (in which the knife back 128 and most knife sections 130 are omitted) the crop divider device 157 may be comprised of a body 180 having a forward end enclosed by a cover 182. Body portion 189 has a rearward extending portion 189 that is fixedly connected to a transversely oriented bracket 187. Bracket 187 has openings there through aligned with openings 185 in cutter bar 132 such that bracket 187 can be attached with nuts/bolts 186a, 186b (FIG. 11) received into openings 185.

Cover 182 may have an upper portion 191 and a lower portion 184. Upper portion 191 may be engagable with and detachable from lower portion 184. As shown in FIG. 12C, the rear wall 184a of lower portion 182 may contain notches/slots/openings 186 disposed on opposite sides of the body 180 for receiving cutting forks 163a, 163b having slots 164a, 164b. Cover 182 may be shaped such that slots 164a, 164b of receiving forks 163a, 163b may be exposed to allow knife sections 130 (such as the single knife section 130 as shown in FIG. 12C) to pass into the slots during transverse reciprocating movement of the knife sections partially under top cover portion 191 of crop divider 157 (see FIG. 12c). In this way, crop material that moves between the forks 163a, 163b immediately adjacent to both sides of crop divider 157 will be cut by the movement of knife sections 130 carried by knife back 128.

In some embodiments such as is shown in FIGS. 13 to 17, one or more hold down components 126 on either or both sides of crop divider 157 may be omitted and may be replaced by one or more spacer plates 1126. Spacer plates 1126 may be provided in place of hold down components in other selected locations along the length of the cutter bar assembly, and in embodiments that do not have a crop divider 157.

By way of example, up to, or even more than, 6 hold down components 126 proximate to crop divider 157 (eg. behind/ through the crop divider 157, and on each side of crop divider 157), may be replaced by one or more spacer plates 1126.

Each spacer plate 1126 may be generally rectangular flat plate member with a transverse length about the same length as a hold down component 126, and may have vertical openings 1127a, 1127b there through such that spacer plates 1126 can be mounted to the respective main guard components 124 and cutter bar 132 in a manner like hold down components 126. However, spacer plates 1126 maybe configured such that the forward edge surface of each spacer plate 1126 maybe positioned flush with the forward edge surface of the cutter bar 132. Thus, spacer plates 1126 do not have a flange portion that extends forward to hold down a rear edge of knife backs 128 (knife backs 128 and knife sections 130 are not shown in FIGS. 13-17 for clarity) when received in the aligned knife back receiving portions 160 of the main guard components 124. The configuration of this assembly allows for the arc of the knife drive action on the knife back(s) to have increased range of motion forward and rearward without binding against a flange portion of a hold down component.

A knife head 138 may be fixedly interconnected to each knife back 128 and may be made of a strong material and be designed to be able to withstand relatively large forces as it interconnects the output of the knife drive apparatus 139 to a knife assembly 129. If a cutting system 122 has more than one knife assembly 129, each knife assembly 129 may have a knife head (such as knife heads 138a, 138b in FIG. 11) to interconnect each knife assembly with the knife drive apparatus 139. In the interconnection of the knife drive apparatus 139 and a knife drive assembly 129, there may be rotational forces associated with the drive connection, so a bearing of some kind may be provided between the two inter-connected components. Each knife head 138 may be for example a cast piece with machined faces for a bearing mount and mounting holes for bolting to the knife back 128 (for example using holes like those used by the knife sections 130). In order to protect knife back 128 from high concentrations of stress, knife head 138 may include a long tapered member 154a, 154b (FIG. 11) that bolts onto a respective knife back 128a, 128b parallel to the knife back and may extend for a distance of for example 1 or 2 feet. At the thick end of this tapered member is the bearing mount that interfaces to the knife drive apparatus 139.

Knife back 128 may be a strong hard flat extended flat bar made of one or more suitable materials such as a high strength steel. Knife back 128 may have a plurality of spaced vertical openings along length at regular intervals that coincide with bolt openings in knife sections 130. Knife sections 130 may be bolted to the knife back 128, side by side without spacing. At one end of the assembly is a knife head 138.

Knife back 128 with knife sections 130 and a knife head 138 attached thereto, may be supplied as a pre-assembled unit by a knife back manufacturer. There may be one or two knife assemblies 125 on a cutter bar 132, depending on the knife drive arrangement. Individual knife sections 130 can be replaced if damaged, or an entire knife assembly 125 may be replaced.

As shown in FIG. 4, knife sections 130 may be generally triangular in shape, and each may have an apex 130b directed in a generally forward direction. At the base portion 130a of each triangular shaped knife section 130, the knife sections may for example be about 3 inches wide narrowing to an apex tip 130b. Knife sections 130 may be made from one or more suitable materials that are relatively strong and which can provide for sharp blade side edges. For example, knife sections may be made from a hardened steel and may have slanted and serrated side edges. Knife sections 130 may be mounted in alternating slant up-down-up arrangement so that blades of one knife section will cut generally at their lower surface plane (ie blade edge tapered downwards), and adjacent knife sections will cut generally at their upper surface plane (ie blade edge tapered upwards).

Figure 2B:
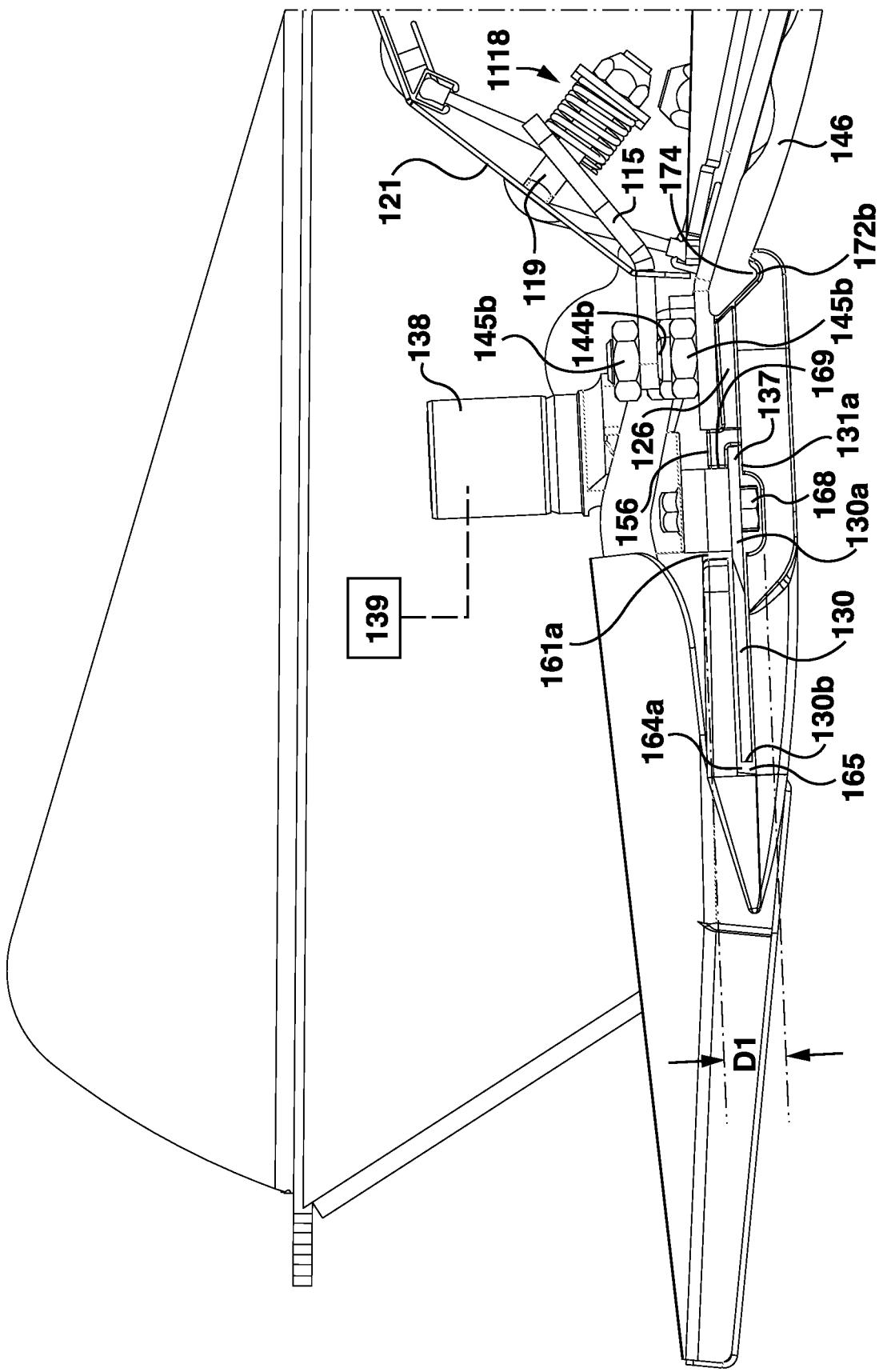
FIG. 2B is a similar view as FIG. 2A of a cutting system of FIG. 2.

Preferably a gap 165 between the forward tip of the knife sections 130 and the end of the slot 164a, 164b in each fork 163a, 163b which are engaged is small (eg. about 2 mm) (FIG. 2B). By providing a relatively small gap 165 between the tip 130b of each of the knife sections 130 and the forward end of the respective slots 164a, 164b that the knife sections move within, the build-up of un-desirable material such as crop material, in gap 165 can be minimized, or even substantially eliminated. This can reduce the risk of the knife sections 130 becoming jammed during movement through forks 163a, 163b, through slots 164a, 164b.

The outer side edges 166 of the upper and lower portions of forks 163a, 163b, which define in part the boundary of slots 164a, 164b, may be configured to provide co-operating sharp cutting edges (FIGS. 9 and 10). The effect of such cutting edges, which can operably co-operate with sharp serrated and tapered blade edges of knife sections 130, is such that when crop material is positioned between the blade edge of a knife section 130, and the outer side edge 166a, 166b, of a respective fork 163a, 163b, movement of the knife section 130 into and at least partially through the slot, will create a scissor-like shearing/cutting action that results in the cutting of that crop material. The tighter the vertical gaps within the slots between the side edges 166 of forks 163a, 163b, and the upper/lower edges of the knife sections 130, the more effective will be the cutting action on the crop material. The arrangement of the aforementioned components in cutting system 122 can facilitate the formation of relatively small vertical gaps in slots 164a, 164b. These small vertical gaps can be substantially maintained over long-time periods of extensive use, in the area of the forks 163a, 163b and the knife sections 130 that move through the slots.

Main guard component 124 also has a knife back recessed receiving portion 160 positioned between base portion 130 and forward double fork cutting portion 162. Recessed receiving portion 160 is configured to provide a vertical recess into which components of a knife assembly 129 can be received. The width X1 and depth D1 (see FIGS. 2A, 2B and 6) of the recessed receiving portion 160 may be such that lengthwise portions of knife back 128 with one or more knife sections 130 attached thereto with bolts and their bolt heads 168 may be received therein and pass transversely there through during transverse reciprocating motion. In particular, it will be observed in FIGS. 2A and 2B that a forward transverse edge portion 131a of the upper surface of body portion 131 provides a lower edge support for base 130a of knife sections 130. The forward portion of knife sections 130 may be supported from beneath by the upper surfaces of slots 164a, 164b in forks 163a, 163b. The forks 163a, 163b have respective rearward facing side surfaces 161a, 161b that will provide a forward barrier to movement of knife back 128 during reciprocating movement of knife assembly 129. A barrier to rearward movement of knife back 128 is provided by each rear hold-down component 126, as discussed further hereinafter.

With again reference to FIGS. 2-10, rear hold-down components 126 may have rearward directed leg portions 158a, 158b, with respective vertical openings 127a, 127b there through (FIG. 7). Leg portions 158a, 158b are spaced from each other and extend rearward from a generally L-shaped body portion 159. The forwardly extending ledge of L-shaped body portion 159 forms a flange 156. As will be evident from FIGS. 2-3 and FIG. 4, when leg portions 158a, 158b of each rear hold down component 126 are sandwiched between the base portion 131 of a corresponding main guard component 124 and the front region of cutter bar 132, the flange 156 of each rear hold-down component 126 extends forward and above the upper surfaces of rear edges 137 (FIGS. 2, 2B, 9 and 10) of knife sections 130. While there may be some degree of contact, for example intermittent contact between the downward facing surface of flange 156 and the upper surfaces of edges 137 of knife sections 130, it is noted that the knife sections 130 are required to slide transversely relative to the flanges 156 and forward edge 131a of main guard portion 124, in operation of cutting system 122.

Rear hold-down components 126 and forward edges 131a of main guards 124 may thus function to provide corresponding rear upward/downward vertical control of the knife back 128 and the knife sections 130 attached thereto by the interface of flanges 156/forward edge 131a and edges 137 of knife sections 130 (FIGS. 2 and 2B) of knife sections 130.

Rear hold-down components 126 may also function to space the main guard component 124 vertically in relation to cutter bar 132 (see FIGS. 2, 2A and 2B). In this regard the body section 133 of base portion 131 of main guard component 124 may have a depth that is selected to be compatible with the depth of leg portions 158a, 158b of hold-down component 126 such that when the top surfaces 155a, 155b of hold-down components 126 mate with the downward facing surface of cutter bar 132, the main guard component 1224 is oriented at an appropriate relative angle (eg. zero/parallel) to the orientation of the front region of cutter bar 132. Additionally, the components can have depths selected such that the top surface areas 176 of forks 163a, 163b are generally or nearly flush with both the top surface of knife back 128 and the top surface of flange 156 (which overhangs edges 137 (FIGS. 2 and 2A) of knife sections 130) of hold-down component 126, and also generally or nearly flush with the top adjacent surface of cutter bar 132, as can be seen in both FIGS. 2, 2A, 2B and 3.

As noted above, forks 163a, 163b of main guard component 124 have respective rearward facing side surfaces 161a, 161b that provide a forward barrier to any substantial movement of knife back 128 during reciprocating movement of knife assembly 129. A forward facing surface 169 (FIGS. 2, 2A, 2B, 6 and 8) of flange 156 provide a barrier to any substantial rearward movement of knife back 128 when rear hold-down component 126 is connected to main guard assembly 124 and cutter bar 132 as shown in FIGS. 2-4.

Thus knife sections 130 can pass into slots 164a, 164b with substantially no forward or rearward gap between the side surfaces of the knife back 128 and the inward/forward facing surface 169 of flange 156 and the inward/rearward facing side surfaces 161a, 161b of forks 163a, 163b as the knife back moves transversely within recessed receiving portion 160 (see in particular FIGS. 9 and 10). This configuration can substantially reduce or eliminate the tendency of the knife back 128 and the knife sections 130 attached thereto, to oscillate laterally (eg. with sinusoidal lateral and transverse movement) when the knife back 128 and knife sections are being driven in reciprocating lateral movement by the knife drive apparatus 139.

In combination with the hold-down components 126, the assembly of knife back 128 being restrained from front and backward movement as it moves transversely within recessed receiving portion 160 of main guard component 124 can also substantially prevent forward/backward movement of the knife back 128 (and the knife sections 130 attached thereto) relative to the fork cutting portion 162 of main guard component 124. This may significantly reduce the amount of wear and/or damage on the knife sections 130 that would otherwise normally result over time from extensive use in a cutting system. Additionally, the more stable motion of the knife sections 130 and knife back 128 can provide better operation and less wear/damage to the bearing that connects the output of the knife drive apparatus 139 with the knife head 138.

With particular reference to FIGS. 2-4 and 8, knife sections 130 may be attached to knife back 128 through openings 142a, 142b with bolts 177 having bolt heads 168 positioned beneath knife sections 130 and knife back 128. Low profile nuts 171 maybe provided on an upper surface of knife back 128 to secure the bolts 177. Each recessed receiving portion 160 of main guard component 124 may be configured to receive, in addition to the entire depth of the knife back 128, the entire depth of a knife section 130, and the entire depth of a bolt head 168 of knife section securing bolts, that are secured to the knife back 128 (see FIGS. 2, 3, 6 and 7).

Thus, in operation of cutting system 122, when knife back 128 is driven by knife drive apparatus 139 in reciprocating transverse movement, heads 168 of securing bolts may thus pass, along with the rear mounting portions of knife sections 130 and knife back 128, through the recessed receiving portion 160 of base portion 131 during transverse reciprocating movement of the knife sections 130 and knife back 128. Additionally, the depth of recessed receiving portion 160 may be such that the top surface of the knife back 128 is substantially flush with (or a small distance vertically below) the adjacent top surfaces of forks 163a, 163b.

Figure 6:
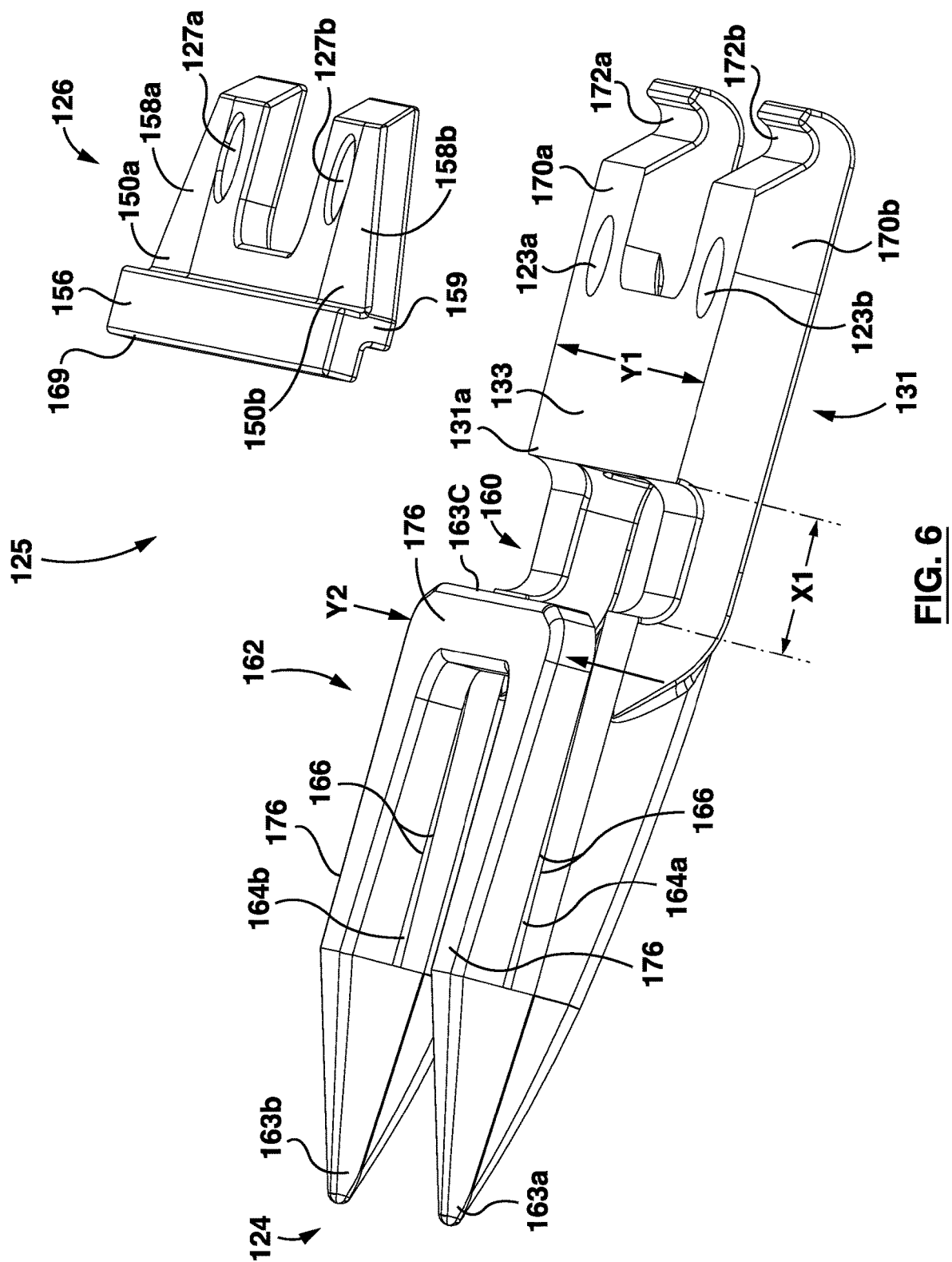
FIG. 6 is a top side perspective view of some components of the cutting system of FIG. 2 in a disassembled state.

Again with particular reference to FIGS. 6 and 7, rearward positioned base portion 131 of each main guard component 124 may include a body section 133 and rearward extending and spaced leg portions 170a, 170b. Vertically oriented openings 123a, 123b may be provided in respective leg portions 170a, 170b. Additionally, at rear edge portions of leg portions 170a, 170b may be integrally formed curved clips 172a, 172b.

Clips 172a, 172b may be configured to function retain co-operating longitudinally extending, forward positioned, co-operating clip protrusion(s) or retention receiver(s) 174 of skid shoes/plates 146 (FIGS. 2A and 2B). As all portions of the main guard component 124 may be integrally formed from a single, relatively strong and durable material, clips 172a, 172b may be more durable/wear resistant than the separate clips known in the art, and may reduce the overall amount of time/labor required to mount the skid shoes/plates 146 to the cutter bar 132. Additionally, as clips 172a, 172b may be integrally formed, they do not have the tendency to become easily detached during operation.

By way of examples only, the entire main guard component 124 may be made from one integrally formed strong metal material. A particularly useful class of materials for forming the main guard component 124 is that of forged steels. Main guards 124 may be initially formed by monolithic forging and then slots 164a, 164b may be machined out of the forged piece of metal to form precise dimensions for the slots. Additionally, key impact areas of the main guard 124 may have additional hardening by known processes.

As knife sections 130 move into, within and out of slots 164 of main guard components 124, the forks 163a, 163b provide vertical movement control in the forward region of the knife sections 130. Thus, at the forward region of the knife assemblies 129, the upper portions of forks 163a, 163b and strut 163c may prevent any significant vertical movement during operation of the cutting system 122. The lower portions of forks 163a, 163b and forward edge 131a of base portion 131 of main guard component 124 prevent any significant downward vertical movement of the knife assemblies 129 during operation.

Thus, cutting system 122 may provide an upper surface area over which crop material passes in operation, stretching from the forward tip of knife guard assemblies 125 onto the cutter bar 132, that is generally flush/smooth/planar (apart possibly from relatively low profile fasteners/nuts used in at least some embodiments to secure various components together).

It is also noted that hold-down components 126 may have a transverse dimension that is greater than the transverse dimension of the base portion 131 of main guard component 124, so that when mounted to cutter bar 132, hold-down components 126 may have only a small space (eg. 1/16 inch space) between adjacent hold-down components 126 compared to a larger space (for example a 2 inch space) between the base portions 131 of adjacent main guard components 124. This substantially continuous coverage of the cutter bar 132 on the underside surface can function, in combination with the skid shoes 146, as a wear plate that provides protection in a substantially continuous manner forward/rearward and transversely across the lower surface cutter bar 132, from wear resulting for example from moving contact with the ground.

As referenced above, rear control of the vertical motion of the knife sections 130 mounted to the knife back 128, is achieved with hold-down components 126. In contrast to known cutting systems which may provide one hold-down device per foot of knife back, at a width of about 2 inches [per foot], cutting system 122 provides for vertical control of the knife assembly 129 by (a) holding down the rear section of the knife assembly 129 substantially continuously for the whole length of the knife back 128 and (b) holding down the front section of the assembly for a substantial/majority proportion of the length of the knife assembly (eg. the front may be held down by the main guard components for 4 inches, then a 2 inch gap, then 4 inches of hold down). The result can be substantially or close to 100% rear hold-down of knife assembly 129 and a majority (eg. roughly about 67%) front hold-down of the knife assembly 129.

However, while hold-down components 126 can function to protect the lower forward surface of cutter bar 132, and provide substantially 100% hold down of the rear region of the knife assembly, there is a potential concern associated with the close proximity of adjacent hold-down components 126 to each other along the length of cutter bar 132. The close proximity of adjacent hold-down components 126 to each other could in some embodiments and conditions, create the risk of a binding abutment condition arising if cutter bar 132 has any significant degree of flexible deflection along its length during use.

Figure 8:
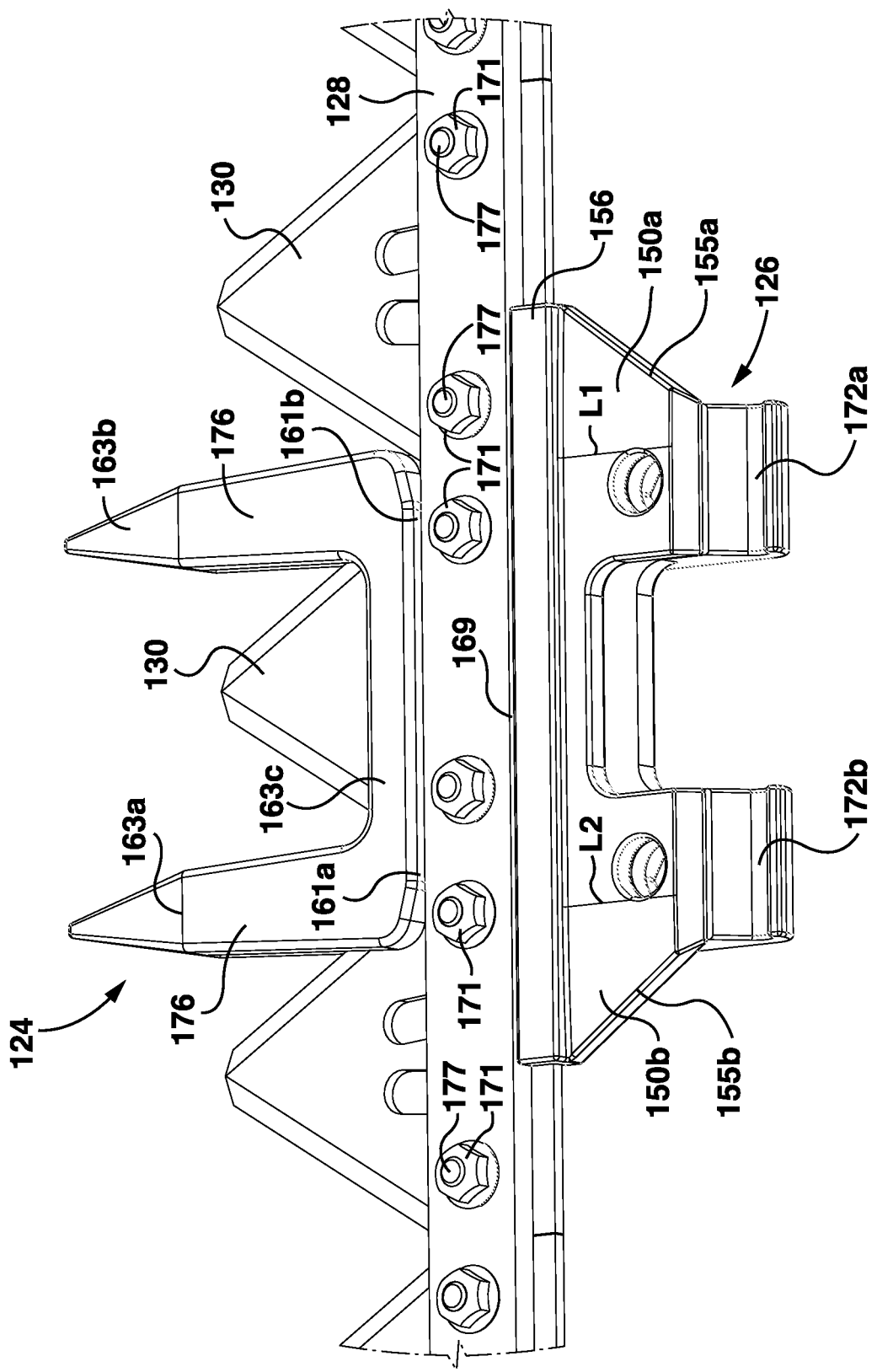
FIG. 8 is a top rear perspective view of some components of FIG. 2 assembled.

With particular reference to FIGS. 6 and 8, it can be observed that in order to minimize or substantially eliminate a risk of such binding during longitudinal flexing of cutter bar 132, the upper surfaces 150a, 150b of the leg portions 158a, 158b can taper in an outward transverse direction, downwards from the inner transverse locations demarcated by lines L1 and L2 (FIG. 8) to the outward top side edges 155a, 155b to assist in allowing cutter bar 132 to flex along its length upwards between the end points to achieve a concave down profile (like a "frown") within its normal operating range of motion. Thus, with such concave down profile, since the axis of zero longitudinal deflection is above the legs 158a, 158b, a frown shape deflection profile would otherwise place the legs 158a, 158b into compression causing a binding effect tending to resist the deflection.

Because each main guard assembly 124, including hold-down component 126, is mounted on the underside of the cutter bar 132, flexing of the cutter bar 132 to provide a concave up profile (like a "smile") is not constrained by the hold-down components 126, which, being below the axis of zero deflection, naturally separate from each other and the cutter bar 132 during such deflections.

It should also be noted that during cutter bar flexing, most of the deflection will occur in the area of the cutter bar that is adjacent the area between adjacent main guard components 124, not in the area of the cutter bar that is adjacent the body of each main guard component (in areas FX1 as opposed to areas FX2 as marked in FIG. 4).

Hold-down components 126 may be a unitary piece of a single material. In alternate embodiments, hold-down components 126 may be made as more than separate parts, and then the separate parts may be joined together. Hold-down components 126 may be made from one or more suitable materials using any suitable manufacturing process. By way of example, a hold down component 126 may be made by investment casting of a suitable material such as a stainless steel or high carbon steel. Hold-down component 126 may made from a harder material than the materials of the cutter bar 132 or main guard component 124. It should be noted that in cutting system 122, the use of forged steel main guard components 124 is such that they are typically about four times stronger than known guards in known cutting systems. The two-part construction of main guard components 124 and hold-down components 126 allows for precise machining of the forged component and the used of an investment cast rear hold-down component 126 compliments this precision, which can result in a consistently fabricated knife guard assembly 125 with tight tolerances.

A header 112 with a cutting system 122 may be able to cut crop material at a position significantly lower to the level of the ground surface where the crop material is standing compared to most if not all known systems. For example, cutting system 122 may be able to cut about 5/8" lower to the level of the ground surface compared to at least some conventional cutting systems and even lower than that compared to other known cutting systems. The actual height of the knife sections 130 above the level of the ground in any particular cutting system on a header will depend on various factors including the specific cutter bar design and the configuration and tilt position of the header. In its lowest configuration, such a cutting system 122 may be able to cut approximately ½" above the level of the ground surface. This is in part, due to the knife sections 130 in cutting system 122 being bolted to the bottom side surface of the knife back 128.

Cutting system 122 may also be configured to provide a side profile which provides a sandwich type assembly and which generally presents an upper surface from the front tip of knife guard assemblies 125 to cutter bar 132 which is substantially flush/smooth—apart possibly from relatively low profile fasteners/nuts used to secure the bolts that bolt various components to cutter bar 132, and/or possibly low profile fasteners/nuts used to secure the bolts which secure the knife sections 130 to knife back 128.

Cutting system 122 may also have a relatively small number of parts compared to known cutting systems. For example, it is anticipated in some embodiments, one part per foot of length of the cutter bar may be eliminated compared to comparable know header designs.

This relative reduction in the number of parts utilized may potentially reduce the overall costs of the components for a cutting system, as well as reduce the labor time-cost associated with initial manufacture and/or associated with assembly and dis-assembly for repair work.

A method of assembling a cutting system 122 may include the following steps:
- attach a plurality of knife sections 130 to knife back 128 by bolting knife sections with heads below the knife back 128;
- secure a rear clip 146a of at least one skid shoes 146 over at least part of the rear transversely extending edge 132a of cutter bar 132;
- loosely mount (eg. by inserting bolts from beneath the cutter bar through openings) a plurality of main guard components 124 and corresponding hold-down components 126 at a lower surface area of said cutter bar 132, such that a body portion of each hold-down component is sandwiched between a body portion of a main guard component and the cutter bar;
- insert skid shoe protrusion(s) 174 into clips 172a, 172b of each main guard component 124 to secure the skid shoe to the lower surface of the cutter bar;
- complete securement (eg. by tightening bolts) of combination of knife assembly 125 and knife guard assemblies 124 to cutter bar 132;
- insert knife back 128 and attached knife sections 130 into recessed receiving portion 160 of base portion 131 and slots 164a, 164b of main guard component 124, such that the knife back and attached knife sections 130 are restrained from substantial upward/downward motion and from substantial forward/backward motion by main guard component 124 and rear hold-down component 126; and
- connect knife head 138 that is interconnected to the knife back 128 to the output of knife drive apparatus 139.

Although each embodiment described above represents a single combination of elements, all other possible combinations of the disclosed elements are also possible.

It will also be appreciated by those skilled in the art, that changes could be made to the various aspects of the subject application described above without departing from the inventive concept thereof. It is to be understood, that this subject application is not limited to the particular aspects disclosed, but it is intended to cover modifications as defined by the appended claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. A cutting system for a harvesting header comprising:
    a transversely extending cutter bar;
    first and second transversely extending knife backs supported in relation to said cutter bar and being axially aligned with each other in a transverse direction, said first and second knife backs each having a main body portion;
    at least one knife section mounted to each of said first and second knife backs, each said at least one knife section having at least one knife edge extending generally in a forward direction;
    wherein said first knife back is not attached to said second knife back; and
    a crop divider structure interconnected to said cutter bar and operationally positioned between said first and second knife backs.

2. A header for an agricultural equipment apparatus, said header comprising:
    a frame; and
    a cutting system attached to said frame, said cutting system comprising the cutting system of claim 1.

3. An agricultural equipment apparatus comprising:
    a propulsion unit; and
    a header comprising (i) a frame and (ii) a cutting system attached to said frame, said cutting system comprising the cutting system of claim 1.

4. A cutting system as claimed in claim 1 further comprising:
    a plurality of knife guard components co-operating with each said at least one knife section to cut crop material, each said plurality of knife guard components being interconnected to said cutter bar.

5. A cutting system as claimed in claim 1 further comprising: a knife guard component, said knife guard component having a front guard portion and a rear portion interconnected by a medial portion, said medial portion having a recess, said medial portion having a lengthwise portion of said knife back received therein, said at least one knife section operable to move transversely at least partially into and out of a cutting slot in said front guard portion.

6. A cutting system as claimed in claim 5 wherein a portion of said knife guard component is located at a transverse position at least partially within an opening in a portion of said crop divider structure.

7. A cutting system as claimed in claim 1 further comprising:
    a first knife guard having a front guard portion and a rear portion and interconnected to said cutter bar, said at least one knife section of said first knife back operable to move transversely at least partially into and out of a cutting slot in said front guard portion of said first knife guard;
    a second knife guard having a front guard portion and a rear portion and interconnected to said cutter bar, said at least one knife section of said second knife back operable to move transversely at least partially into and out of a cutting slot in said front guard portion of said second knife guard;
    said first knife guard being positioned on a first transverse side of said crop divider structure, and said second knife guard being positioned on a second transverse side of said crop divider structure, said second transverse side being opposite of said crop divider structure to said first transverse side.

8. A cutting system as claimed in claim 7, wherein a portion of said crop divider structure in positioned forward of said front guard portions of each of said first and second knife guards.

9. A cutting system as claimed in claim 7, wherein a portion of said crop divider structure has a forwardly positioned, generally triangular shaped portion having a forward apex region.

10. A cutting system as claimed in claim 9, wherein said triangular shaped portion is configured such that during operation, crop engaged by said triangular shaped portion will be directed toward either said first knife guard component or said second knife guard component for cutting either by said at least one knife section of said first knife back section or said at least one knife section of said second knife back section.

11. A cutting system as claimed in claim 9, wherein crop divider structure further comprises a rearwardly extending portion interconnected to said cutter bar.

12. A cutting system as claimed in claim 1, wherein said crop divider structure comprises a lower portion that is interconnected to said cutter bar and a detachable upper cover portion.

13. A cutting system as claimed in claim 1, further comprising a knife drive system operable to drive said first knife back and second knife back in reciprocating transverse movement.

14. A cutting system as claimed in claim 1, further comprising a knife drive system operable to drive said first knife back and second knife back in reciprocating transverse movement.

15. A cutting system as claimed in claim 14, further comprising a first knife head interconnected to said first knife back and operable for interconnecting said knife drive system to drive said first knife back, and said cutting system further comprising a second knife head interconnected to said second knife back and operable for interconnecting said knife drive system to drive said second knife back.

16. A cutting system as claimed in claim 15 wherein at least a portion of said crop divider is positioned forward of said first knife head and said second knife head.

17. A cutting system as claimed in claim 15 wherein said crop divider is positioned transversely between said first knife head and said second knife head.

18. A cutting system as claimed in claim 17 wherein at least a portion of said crop divider is positioned forward of said first knife head and said second knife head.

19. A cutting system as claimed in claim 14, wherein said knife drive system comprises a first drive member operable to drive said first knife back and a second drive member operable to drive said second knife back.

20. A cutting system as claimed in claim 19 wherein at least a portion of said crop divider is positioned transversely between said first drive member and said second drive member.

21. A cutting system for a harvesting header comprising:
a transversely extending cutter bar;
a crop divider structure interconnected to said cutter bar and operationally positioned between a first knife back and a second knife back;
said first and second transversely extending knife backs supported in relation to said cutter bar and being generally axially aligned with each other in a transverse direction;
a plurality of knife sections mounted to each of said first and second knife backs, each of said plurality of knife sections having at least one knife edge extending generally in a forward direction;
said first knife back being generally positioned on a first transverse side of said crop divider structure, and said second knife back being generally positioned on a second transverse side of said crop divider structure, said second transverse side being opposite of said crop divider structure to said first transverse side;
wherein said first knife back is not connected to said second knife back.

22. A cutting system as claimed in claim 21 further comprising:
a first knife guard having a front guard portion and a rear portion and interconnected to said cutter bar, a knife section of said plurality of knife sections of said first knife back operable to move transversely at least partially into and out of a cutting slot in said front guard portion of said first knife guard;
a second knife guard having a front guard portion and a rear portion and interconnected to said cutter bar, a knife section of said plurality of knife sections of said second knife back operable to move transversely at least partially into and out of a cutting slot in said front guard portion of said second knife guard;
said first knife guard being positioned on a first transverse side of said crop divider structure, and said second knife guard being positioned on a second transverse side of said crop divider structure, said second transverse side being opposite of said crop divider structure to said first transverse side.

23. A cutting system as claimed in claim 22, wherein a portion of said crop divider structure in positioned forward of said front guard portions of each of said first and second knife guards.

24. A cutting system as claimed in claim 22, wherein a portion of said crop divider structure has a forwardly positioned, generally triangular shaped portion having a forward apex region.

25. A cutting system as claimed in claim 24, wherein said triangular shaped portion is configured such that during operation, crop engaged by said triangular shaped portion will be directed toward either said first knife guard component or said second knife guard component for cutting either by said knife section of said plurality of knife sections of said first knife back section or said knife section of said plurality of knife sections of said second knife back section.

26. A cutting system as claimed in claim 25, wherein crop divider structure further comprises a rearwardly extending portion interconnected to said cutter bar.

27. A cutting system as claimed in claim 26, wherein said crop divider structure comprises a lower portion that is interconnected to said cutter bar and a detachable upper cover portion.

28. A cutting system as claimed in claim 21, further comprising a knife drive system operable to drive said first knife back and second knife out of phase with each other in reciprocating transverse movement.

29. A header for an agricultural equipment apparatus, said header comprising:
a frame; and
a cutting system attached to said frame, said cutting system comprising the cutting system of claim 21.

30. An agricultural equipment apparatus comprising:
a propulsion unit; and
a header comprising (i) a frame and (ii) a cutting system attached to said frame, said cutting system comprising the cutting system of claim 21.

31. A cutting system for a harvesting header comprising:
a transversely extending cutter bar having first and second opposed cutter bar ends;

a crop divider structure interconnected to said cutter bar and operationally positioned between first and second knife backs, and between said first and second ends of said cutter bar;

said first and second transversely extending knife backs supported in relation to said cutter bar and being generally axially aligned with each other in a transverse direction, said first and second knife backs each having a main body portion;

a plurality of knife sections mounted to each of said first and second knife backs, each of said plurality of knife sections having at least one knife edge extending generally in a forward direction;

said first knife back being generally positioned on a first transverse side of said crop divider structure, and said second knife back being generally positioned on a second transverse side of said crop divider structure, said second transverse side being opposite of said crop divider structure to said first transverse side;

a first knife head interconnected to said first knife back and operable for interconnecting a knife drive apparatus to drive said first knife back;

a second knife head interconnected to said second knife back and operable for interconnecting said knife drive apparatus to drive said second knife back;

said knife drive apparatus comprising first and second knife drive components connected to said first and second knife heads respectively, and said first and second knife drive components located at first and second intermediate transverse positions between said first and second ends of said cutter bar, said knife drive apparatus operable to drive said first knife head and said first knife back in reciprocating transverse movement, said knife drive apparatus operable to drive said second knife head and said second knife back in reciprocating transverse movement.

32. A cutting system as claimed in claim 31, wherein said knife drive apparatus is operable to drive said first knife head and said first knife back in reciprocating movement that is out of phase with the reciprocating transverse movement of said second knife head and said second knife back.

33. A cutting system as claimed in claim 31, wherein said knife drive apparatus is operable to drive said first knife head and said first knife back in reciprocating movement that is 180 degrees out of phase with the reciprocating transverse movement of said second knife head and said second knife back.

34. A cutting system as claimed in claim 31, wherein said crop divider structure is positioned at least partially, transversely between said first and second knife heads.

35. A cutting system as claimed in claim 34, wherein said crop divider structure is positioned at least partially, transversely between said first and second knife drive components.

36. A cutting system as claimed in claim 31, wherein said crop divider structure has a forwardly positioned, generally triangular shaped portion having a forward apex region.

37. A header for an agricultural equipment apparatus, said header comprising:
    a frame; and
    a cutting system connected to said frame, said cutting system comprising the cutting system of claim 31.

38. An agricultural equipment apparatus comprising:
    a propulsion unit; and
    a header comprising (i) a frame and (ii) a cutting system connected to said frame, said cutting system comprising the cutting system of claim 31.

* * * * *